United States Patent
Wang et al.

(10) Patent No.: US 12,465,520 B2
(45) Date of Patent: Nov. 11, 2025

(54) APPARATUSES FOR DRAINAGE OF DEGRADABLE GLAUCOMA CAPABLE OF GRADIENT CONTROL OF SCARS AND METHODS OF MAKING THE SAME

(71) Applicants: CHONGQING UNIVERSITY, Chongqing (CN); THE THIRD AFFILIATED HOSPITAL OF CQMU (FANGDA HOSPITAL), Chongqing (CN)

(72) Inventors: Yong Wang, Chongqing (CN); Xiangji Li, Chongqing (CN)

(73) Assignees: CHONGQING UNIVERSITY, Chongqing (CN); THE THIRD AFFILIATED HOSPITAL OF CQMU (FANGDA HOSPITAL), Chongqing (CN)

( * ) Notice: Subject to any disclaimer, the term of this patent is extended or adjusted under 35 U.S.C. 154(b) by 0 days.

(21) Appl. No.: 19/083,513

(22) Filed: Mar. 19, 2025

(65) Prior Publication Data
US 2025/0221857 A1 Jul. 10, 2025

Related U.S. Application Data

(63) Continuation of application No. PCT/CN2023/139832, filed on Dec. 19, 2023.

(30) Foreign Application Priority Data

Dec. 20, 2022 (CN) .......................... 202211642621.0

(51) Int. Cl.
*A61F 9/007* (2006.01)
*A61K 9/70* (2006.01)
(Continued)

(52) U.S. Cl.
CPC ........ *A61F 9/00781* (2013.01); *A61K 9/7007* (2013.01); *A61K 31/407* (2013.01);
(Continued)

(58) Field of Classification Search
CPC .......... A61F 9/00781; A61F 2210/0004; A61F 2240/001; A61P 27/06; A61K 9/7007;
(Continued)

(56) References Cited

U.S. PATENT DOCUMENTS 6,102,045 A * 8/2000 Nordquist ........... A61F 9/00781
623/4.1
6,369,116 B1 * 4/2002 Wong ................... A61K 9/2013
514/269
(Continued)

FOREIGN PATENT DOCUMENTS

CN 101083976 A 12/2007
CN 102266282 A 12/2011
(Continued)

OTHER PUBLICATIONS

International Search Report in PCT/CN2023/139832 mailed on Apr. 3, 2024, 11 pages.
(Continued)

*Primary Examiner* — Philip R Wiest
(74) *Attorney, Agent, or Firm* — PORUS IP LLC

(57) ABSTRACT

Embodiments of the present disclosure provide a drainage apparatuses with scar gradient control capabilities for degradable glaucoma and methods of making the same cross-reference to related applications, comprising a long-strip-shaped drainage sheet with a uniform overall cross-sectional size, wherein the drainage sheet is made of a biodegradable material, an outer surface of the drainage sheet is provided with a drainage gap that penetrates through opposite sides of the drainage sheet, an outer surface of the
(Continued)

drainage sheet is coated with a biodegradable surface coating, and the surface coating carries an anti-scarring drug, wherein the anti-scarring drug is configured to be gradually released as the surface coating degrades, and a distribution concentration of the anti-scarring drug within the surface coating varies in a non-monotonic manner.

3 Claims, 19 Drawing Sheets

(51) Int. Cl.
*A61K 31/407* (2006.01)
*A61L 31/14* (2006.01)
*A61L 31/16* (2006.01)
*A61P 27/06* (2006.01)

(52) U.S. Cl.
CPC . *A61F 2210/0004* (2013.01); *A61F 2240/001* (2013.01); *A61F 2250/0067* (2013.01); *A61L 31/148* (2013.01); *A61L 31/16* (2013.01); *A61L 2300/204* (2013.01); *A61L 2420/02* (2013.01); *A61P 27/06* (2018.01)

(58) Field of Classification Search
CPC ... A61K 31/407; A61K 31/513; A61L 31/022; A61L 31/086; A61L 31/148; A61L 31/16
See application file for complete search history.

(56) References Cited

U.S. PATENT DOCUMENTS

| | | | |
|---|---|---|---|
| 7,207,965 B2 * | 4/2007 | Simon | A61F 9/00781 604/8 |
| 11,517,476 B2 * | 12/2022 | Pinchuk | A61F 9/00781 |
| 2006/0240073 A1 | 10/2006 | Hsu et al. | |
| 2010/0022661 A1 | 1/2010 | Lichter et al. | |

FOREIGN PATENT DOCUMENTS

| | | |
|---|---|---|
| CN | 105266952 A | 1/2016 |
| CN | 109937025 A | 6/2019 |
| CN | 114869862 A | 8/2022 |
| CN | 115969612 A | 4/2023 |
| WO | 02074196 A1 | 9/2002 |

OTHER PUBLICATIONS

Written Opinion in PCT/CN2023/139832 mailed on Apr. 3, 2024, 8 pages.

* cited by examiner

Check number:14  Report time:2022/8/14
Name: rabbit 14

Check number:2  Report time:2022/8/14
Name: rabbit 2

FIG. 9

APPARATUSES FOR DRAINAGE OF DEGRADABLE GLAUCOMA CAPABLE OF GRADIENT CONTROL OF SCARS AND METHODS OF MAKING THE SAME

CROSS-REFERENCE TO RELATED APPLICATIONS

This application is a Continuation of International Application No. PCT/CN2023/139832, filed on Dec. 19, 2023, which claims priority to Chinese Patent Application No. 202211642621.0, filed on Dec. 20, 2022, the entire contents of each of which are hereby incorporated by reference.

TECHNICAL FIELD

The present disclosure relates to the field of medical implant technology, and in particular, to an apparatus for drainage of degradable glaucoma capable of gradient control of scars and a method of making the same.

BACKGROUND

Glaucoma is a group of optic nerve diseases characterized by visual field defects and optic nerve atrophy. As the second leading cause of blindness worldwide, glaucoma is a primary cause of irreversible blindness. Elevated intraocular pressure (IOP) is a main risk factor for optic nerve atrophy in glaucoma, and lowering IOP is currently the only proven effective process to delay glaucomatous optic nerve damage. When drug treatment fails to control the IOP, surgery becomes the primary process of treating glaucoma by diverting and draining the aqueous humor to other pathways to other areas.

Traditional glaucoma drainage apparatuses have a drainage tube with a fixed diameter, which may lead to rapid drainage of aqueous humor in the early stages of surgery, causing complications such as a shallow anterior chamber. In the later stages of implantation of the drainage apparatus, due to long-term foreign body stimulation, the drainage apparatus may be encapsulated by scar tissues, resulting in reduction of a volume of aqueous humor drainage and re-increase of IOP, which may lead to the failure of the surgery. At the same time, the front end of the traditional glaucoma drainage tube remains in the anterior chamber for a long time, continuously rubbing against the corneal endothelium, which may cause loss of corneal endothelial cells, leading to corneal decompensation, corneal haze, and decreased transparency. Patients may experience significant discomfort such as a foreign body sensation and tearing, which may require the removal of the drainage apparatus, causing IOP to rise again, surgical failure, or even the need for corneal endothelial transplantation surgery.

To address the problem of aqueous humor drainage channel healing caused by postoperative scarring in glaucoma, the current process involves temporarily applying anti-scarring drugs under the conjunctiva during surgery (washed off with saline after 2-4 min). However, the process has several drawbacks: first, the effect of anti-scarring drugs under the conjunctiva is short-lived, and after washing, the drugs are completely lost, which leads to a lack of anti-scarring drugs in the conjunctiva in the middle and late stages of surgery, making it easy for the wound to scar and increasing the risk of surgical failure; second, the high concentrations of anti-scarring drugs currently used in surgery have strong toxicity and irritation, which may cause discomfort to patients, and even serious side effects such as eyeball atrophy, increasing the possibility of surgical failure.

There is therefore a need to provide an apparatus for drainage of degradable glaucoma capable of gradient control of scars and a method of making the same, which ensures excellent safety and unobstructed drainage, while also reasonably controlling the degree of scarring at the implantation site and effectively reducing intraocular pressure (IOP).

SUMMARY

One or more embodiments of the present disclosure may include an apparatus capable of gradient control of scars, configured for drainage of degradable glaucoma. The apparatus may include a long-strip-shaped drainage sheet with a uniform overall cross-sectional size. The drainage sheet is made of a biodegradable material. An outer surface of the drainage sheet is provided with a drainage gap that penetrates through opposite sides of the drainage sheet. The outer surface of the drainage sheet is coated with a biodegradable surface coating, and the surface coating carries an anti-scarring drug. The anti-scarring drug is configured to be gradually released as the surface coating degrades, and a distribution concentration of the anti-scarring drug within the surface coating varies in a non-monotonic manner.

In some embodiments, the distribution concentration of the anti-scarring drug presents a distribution curve that, along a depth direction of the surface coating, first gradually decreases from a high point and then gradually increases, and the distribution concentration reaches a highest point at a bottom of the surface coating.

In some embodiments, the anti-scarring drug is composed of mitomycin-C, 5-fluorouracil, or a mixture thereof.

In some embodiments, a degradation rate of the drainage sheet in vitro in a lactated Ringer's injection solution is 0.01-0.1 mm/month.

In some embodiments, the biodegradable material is pure magnesium, and a magnesium content in the pure magnesium is greater than or equal to 99.99%.

In some embodiments, the biodegradable material is a magnesium alloy, the magnesium alloy comprises the following components by mass percentage: 2.0-5.0% Zn, 0.0-0.5% Ca, 0.0-0.5% Sr, magnesium, and inevitable impurity elements, and a tensile strength of the magnesium alloy is greater than or equal to 200 MPa.

In some embodiments, a thickness of the surface coating is less than or equal to 0.02 mm.

In some embodiments, components of the surface coating are selected from at least one of hydroxyapatite, tricalcium phosphate, or calcium hydrogen phosphate.

One or more embodiments of the present disclosure may include a method for preparing the above-mentioned apparatus capable of gradient control of scars, configured for drainage of degradable glaucoma. The method may include: 1) providing the drainage sheet; 2) preparing a surface coating solution by liquid-phase deposition; 3) preparing the anti-scarring drug; and 4) placing the drainage sheet in the surface coating solution. During the formation of the surface coating on the drainage sheet, the anti-scarring drug is added intermittently to form a surface coating with a non-monotonic change of distribution concentration on the surface of the drainage sheet.

In some embodiments, adding the anti-scarring drug in an intermittent manner may include adding an amount of the anti-scarring drug every 10 to 30 minutes. The amount is calculated based on the concentration in an actual solution. Initially, the count of the anti-scarring drug is the largest and then gradually decreases. When reaching one-half to two-thirds of the deposition time, the count of the anti-scarring drug is gradually increased until the deposition is complete.

BRIEF DESCRIPTION OF THE DRAWINGS

The present disclosure will be further illustrated by way of exemplary embodiments, which will be described in detail through the accompanying drawings, wherein:

FIG. 9 and FIGS. 10(a)-(d) are schematic diagrams illustrating a corneal endothelial cell condition of a drainage apparatus after implantation into an eyeball according to some embodiments of the present disclosure;

Figure 1:
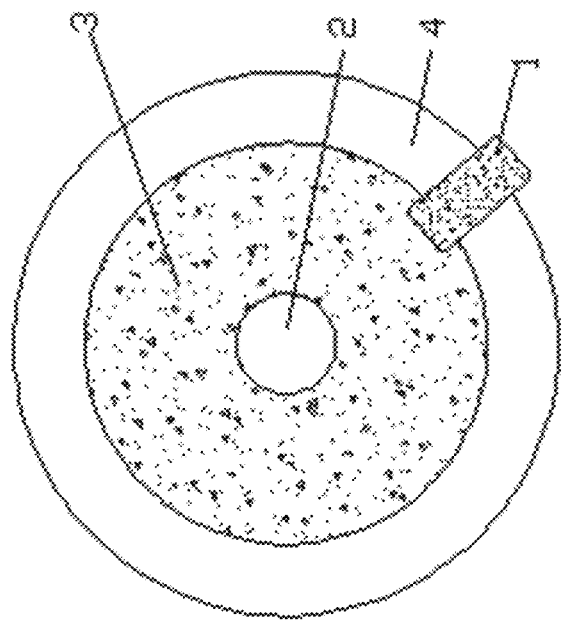
FIG. 1 is a top view of implantation of a drainage apparatus into an eyeball according to some embodiments of the present disclosure.

wherein, 1. drainage apparatus; 2. Pupil; 3. Conjunctiva; 4. Limbus; 11. Drainage sheet; 12. Drainage gap; 13. Surface coating.

DETAILED DESCRIPTION

In order to provide a clearer understanding of the technical solutions of the embodiments described in the present disclosure, a brief introduction to the drawings required in the description of the embodiments is given below. It is evident that the drawings described below are merely some examples or embodiments of the present disclosure, and for those skilled in the art, the present disclosure may be applied to other similar situations without exercising creative labor, unless otherwise indicated or stated in the context, the same reference numerals in the drawings represent the same structures or operations.

The following are definitions of some terms used in the present disclosure.

As used herein, the term "drainage apparatus" refers to a specialized medical product configured to connect an anterior chamber to a subconjunctval space, guiding aqueous humor to flow out from the anterior chamber to reduce intraocular pressure and treat glaucoma.

As used herein, the term "drainage sheet" refers to a sheet-like material made of a biodegradable magnesium alloy used in the drainage apparatus, which constitutes the substrate part of the drainage apparatus.

As used herein, the term "drainage gap" refers to a channel for aqueous humor drainage formed on the surface of the drainage sheet by mechanical processing or chemical etching, which is an important structural unit of the drainage apparatus.

As used herein, the term "surface coating" refers to an additional layer on the surface of the drainage sheet, configured to further improve the effectiveness of the drainage apparatus and expand its range of indications.

One or more embodiments of the present disclosure provide an apparatus capable of gradient control of scars, configured for drainage of degradable glaucoma, comprising: a long-strip-shaped drainage sheet with a uniform overall cross-sectional size, wherein: the drainage sheet is made of a biodegradable material, an outer surface of the drainage sheet is provided with a drainage gap that penetrates through opposite sides of the drainage sheet, the outer surface of the drainage sheet is coated with a biodegradable surface coating, and the surface coating carries an anti-scarring drug, wherein the anti-scarring drug is configured to be gradually released as the surface coating degrades, and a distribution concentration of the anti-scarring drug within the surface coating varies in a non-monotonic manner.

Figure 3:
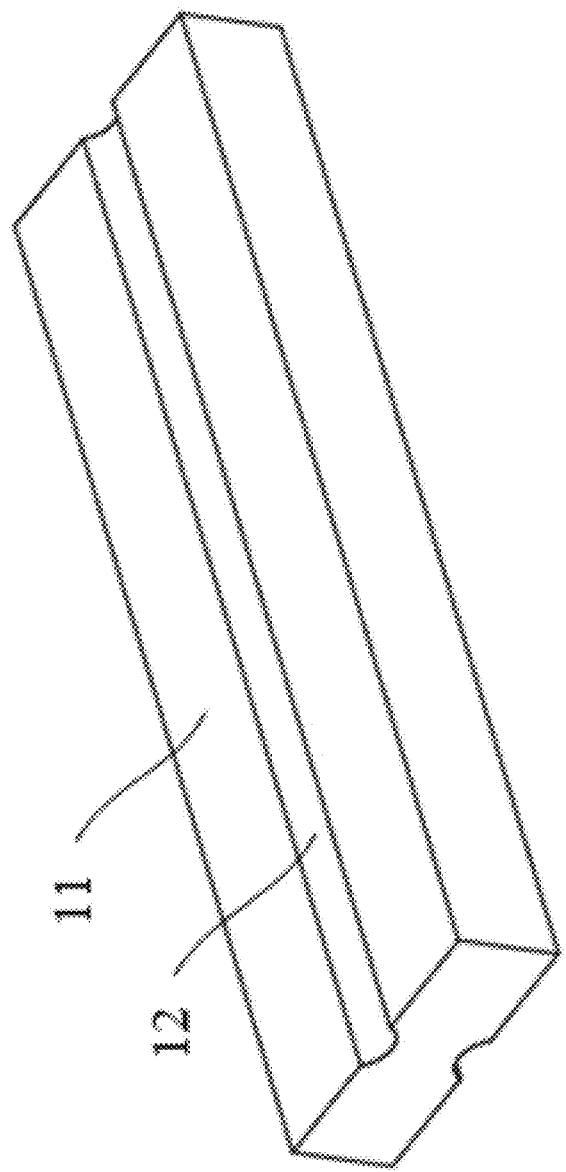
FIG. 3 is a schematic diagram of an overall structure of a drainage apparatus according to some embodiments of the present disclosure.

FIG. 3 is a schematic diagram of an overall structure of a drainage apparatus according to some embodiments of the present disclosure. As shown in FIG. 3, an apparatus capable of gradient control of scars, configured for drainage of degradable glaucoma, is configured to connect an anterior chamber and a subconjunctival space to drain the aqueous humor in the anterior chamber. The drainage apparatus comprises a long-strip-shaped drainage sheet 11 with a uniform overall cross-sectional size, the drainage sheet 11 is provided with a drainage gap 12 that penetrates through opposite sides of the drainage sheet 11, and the drainage sheet 11 is made of a biodegradable material.

Figure 2:
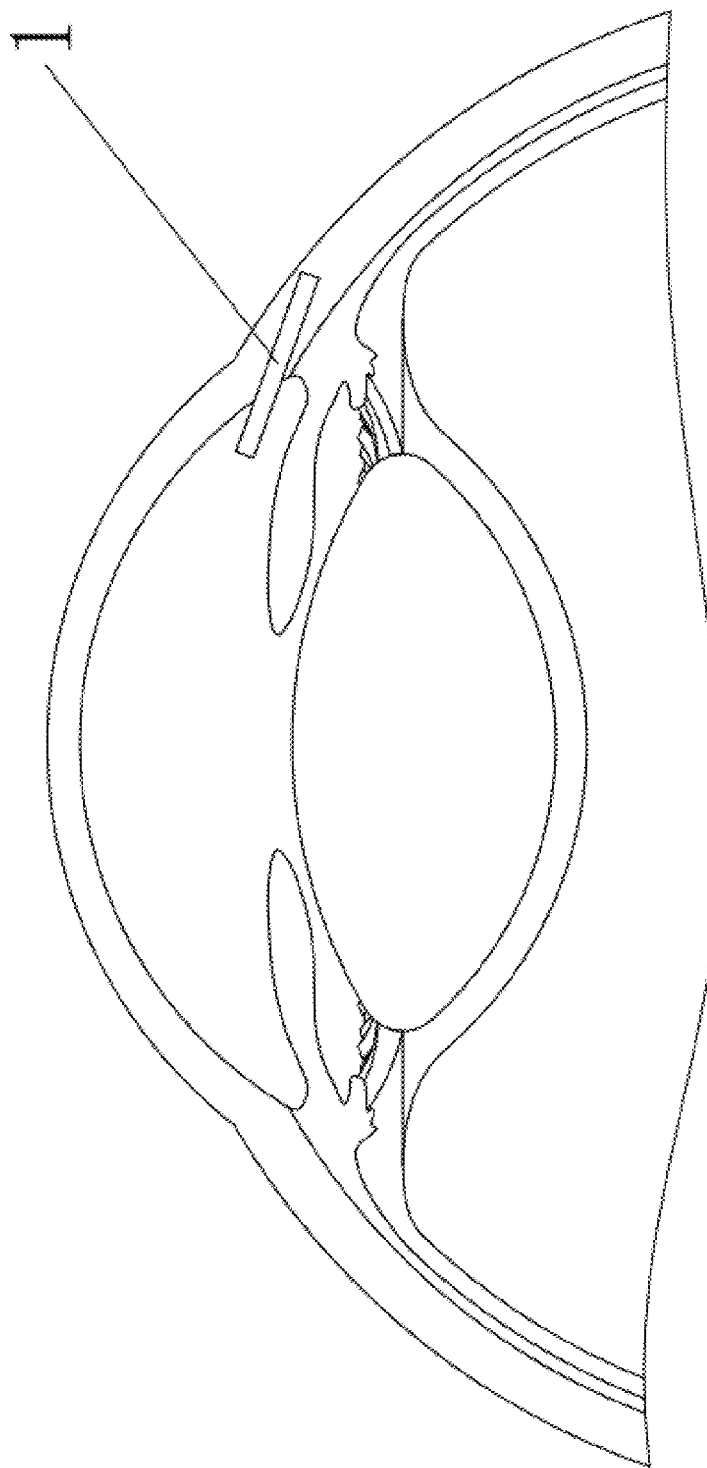
FIG. 2 is a side view of implantation of a drainage apparatus into an eyeball according to some embodiments of the present disclosure.

FIG. 1 and FIG. 2 are respectively a top view and a side view of a drainage apparatus implanted in an eyeball according to some embodiments of the present disclosure. As shown in FIG. 1, one end of the drainage apparatus 1 is inserted into the anterior chamber through an incision at the corneoscleral limbus 4, and the other end is placed under the conjunctiva 3, so that the anterior chamber is connected to the subconjunctival space, through the drainage gap 12 on the surface of the drainage apparatus 1, the aqueous humor can be effectively drained to reduce intraocular pressure.

In some embodiments, the drainage gap 12 may be a single one, or one on each of the opposing surfaces, totaling two.

In some embodiments, if there are two gaps, the drainage gaps on the two surfaces need to be offset by more than 0.2 mm.

In some embodiments, the drainage gap 12 can be formed by mechanical processing or chemical etching on the surface of the drainage apparatus. In some embodiments, the drainage gap 12 is a groove that runs through the length of the drainage sheet and is parallel to the length direction, with a depth of 0.01-0.1 mm and a width of 0.05-0.2 mm.

In some embodiments, the depth of the drainage gap is 0.1 mm and the width is 0.3 mm.

In some embodiments, the depth of the drainage gap is 0.05 mm and the width is 0.1 mm.

In some embodiments, the depth of the drainage gap is 0.05 mm and the width is 0.2 mm.

In some embodiments, the depth of the drainage gap is 0.08 mm and the width is 0.2 mm.

The depth of the drainage gap ranges from 0.01 mm to 0.1 mm, and the width is within the range of 0.05 mm to 0.2 mm. If the drainage gap is too shallow or too narrow, it may be difficult to achieve an effective drainage effect. Conversely, if the drainage gap is too deep or too wide, it may lead to excessive outflow of aqueous humor in the early stage (within about two weeks), which could may not only cause low intraocular pressure but also increase the risk of postoperative complications, and cause significant damage to the structural strength of the drainage apparatus.

In some embodiments, the edges of the drainage sheet 11 are treated by blunting the sharp edges.

In some embodiments, a length of the drainage apparatus is 1-6 mm, a width of the drainage apparatus is 0.5-4.0 mm, and a thickness of the drainage apparatus is 0.1-0.5 mm.

In some embodiments, a length of the drainage apparatus is 3 mm, a width of the drainage apparatus is 2 mm, and a thickness of the drainage apparatus is 0.3 mm.

In some embodiments, a length of the drainage apparatus is 1 mm, a width of the drainage apparatus is 0.5 mm, and a thickness of the drainage apparatus is 0.1 mm.

In some embodiments, a length of the drainage apparatus is 3 mm, a width of the drainage apparatus is 1.5 mm, and a thickness of the drainage apparatus is 0.2 mm.

In some embodiments, a length of the drainage apparatus is 2.8 mm, a width of the drainage apparatus is 1.5 mm, and a thickness of the drainage apparatus is 0.4 mm.

Figure 4:
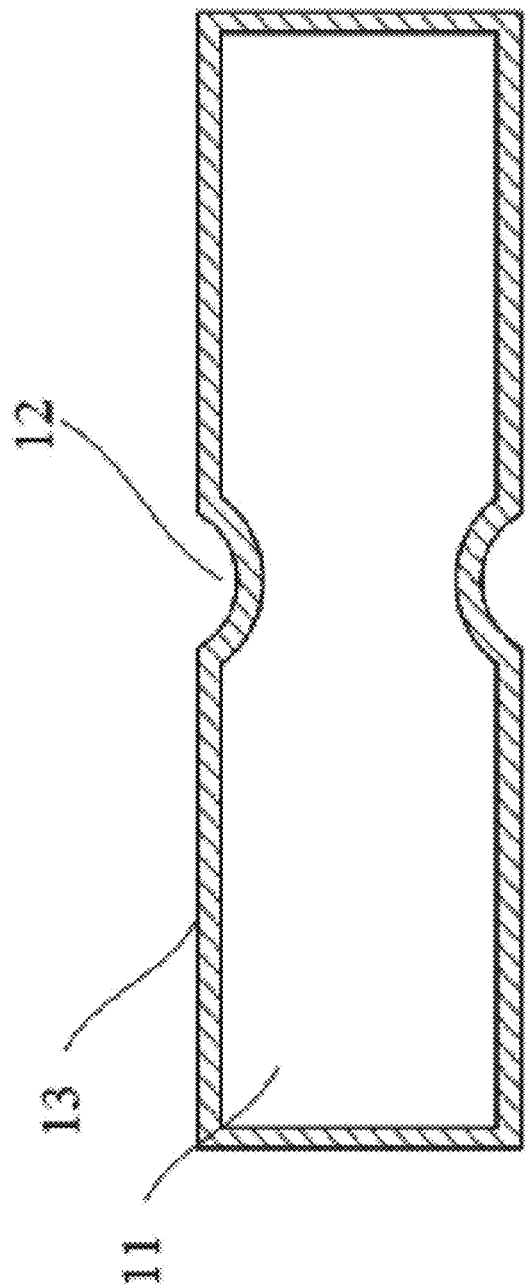
FIG. 4 is a schematic diagram of a side view structure of a drainage apparatus according to some embodiments of the present disclosure.

FIG. 4 is a schematic diagram of a side view structure of a drainage apparatus according to some embodiments of the present disclosure. In order to reduce the degradation rate of the magnesium alloy drainage apparatus and to increase the effectiveness of modulating the proliferation of fibroblasts to increase the range of indications for the drainage apparatus, as illustrated in FIG. 4, the outer surface of the drainage sheet 11 is coated with a biodegradable surface coating 13, and a thickness of the surface coating 13 is less than or equal to 0.02 mm.

In some embodiments, the thickness of the surface coating is 0 mm.

In some embodiments, the thickness of the surface coating may be 0 mm, 0.004 mm, 0.008 mm, 0.01 mm, or 0.02 mm.

In some embodiments, the composition of the surface coating 13 is selected from one or mixture of hydroxyapatite, tricalcium phosphate, or calcium hydrogen phosphate.

In some embodiments, for rational regulation of the degree of scarring at the implantation site, the surface coating carries an anti-scarring drug within the surface coating, the anti-scarring drug is gradually released as the surface coating degrades, and the change in the distribution concentration of the anti-scarring drug in the surface coating is non-monotonic.

In some embodiments, the distribution concentration of the anti-scarring drug within the surface coating follows a curvilinear pattern of gradually decreasing from high and then increasing along its depth, and the distribution concentration reaches a maximum at the bottom of the surface coating.

During use, the degradation process of the drainage apparatus is initiated by the surface coating 13, and the substrate begins to degrade after the surface coating 13 has degraded to a certain extent. However, even during the degradation process, the remaining surface coating 13 still provides protection to the substrate.

During the initial stages of drainage apparatus implantation, the stress response of the organism may lead to relatively intense scar formation and growth. The scar tissues may come into direct contact with the surface of the material, and in severe cases may even cause blockage of the channel. A strong inhibition of the scarring reaction is therefore required during this period. For this reason, anti-scarring drugs have a high surface concentration in the surface coating 13 to ensure a greater release during this critical period, thereby delaying scar formation and maintaining drainage patency.

With the prolongation of implantation time, the scar tissues grow and create a barrier between the material and the normal tissues of the eye. At the same time, the organism adapts to the implanted material, leading to a gradual weakening of the scar inhibition. Therefore, the concentration of the anti-scarring drug may be appropriately lowered, and the count of drug released may be reduced accordingly.

When the surface coating 13 enters the middle and late stages of degradation (starting from about one-third to one-half of the degradation interval), the degradation rate of magnesium or magnesium alloy in the substrate is significantly elevated due to the gradual weakening of the protective effect of the coating on the substrate, releasing a higher amount of magnesium ions and alloy element ions. This may stimulate and induce some intense chronic inflammatory responses, which may lead to hyperproliferation of scar tissues. Therefore, it is necessary to increase the concentration of anti-scarring drug to enhance their release, thereby achieving stronger scar inhibition effects. Similarly, after complete degradation of the surface coating 13, the degradation of the substrate is further accelerated, triggering a more intense scarring response. At this point, a large count of anti-scarring drugs are required to inhibit scar formation. Because there is no longer a sustained release of anti-scarring drugs after the coating has degraded, the concentration of the drug needs to be increased again at the base of the coating to ensure that the surrounding tissue still contains sufficient anti-scarring drugs after the coating has completely degraded. In this way, the anti-scarring effect is maintained even after a certain period of time when the substrate is degraded, ensuring that scar tissue does not continue to develop after the drainage apparatus is completely degraded and ultimately resulting in the formation of an efficient aqueous humor drainage channel surrounded by stable scar tissue.

In some embodiments, the anti-scarring drug is composed of any one or a mixture of both mitomycin-C (MMC) or 5-fluorouracil (5-FU).

In some embodiments, the drug loading of the surface coating 13 is carried out using the coating-synchronized drug loading manner, which involves introducing the drug simultaneously with the preparation of the coating. Specifically, a phosphate coating solution is first prepared to form the surface coating, and an anti-scarring drug is added, with specific amounts being 0.1-1 mg/ml of mitomycin-C and 10-100 mg/ml of 5-fluorouracil. After stirring uniformly, the drainage sheet 11 is placed in the solution for the coating treatment; during the coating treatment, the anti-scarring drug is supplemented at certain intervals, with the initial addition amount gradually decreasing, and when one-third to one-half of the preset coating treatment time is reached, the anti-scarring drug is no longer added, and the addition amount is then gradually increased until the coating treatment is completed. Finally, the drainage apparatus coated with the anti-scarring drug is obtained by washing, drying, and sterilizing.

In some embodiments, the initial addition of the anti-scarring drug during deposition is 1 mg/ml of mitomycin-C, which is then supplemented at 10-minute intervals, each time decreasing in 10% increments from the last. Starting at the 50th minute, each replenishment is incremented by 15% from the last until the end of the coating process.

In some embodiments, the initial addition of the anti-scarring drug during deposition is 100 mg/ml of 5-fluorouracil, which is then replenished at 30-minute intervals, each time decreasing by 5% from the last. Starting at the 720th minute, the count of replenishment is incremented by 10% from the last each time until the coating process is completed.

In some embodiments, the initial addition of anti-scarring drugs during deposition is 0.1 mg/ml of mitomycin-C and 80 mg/ml of 5-fluorouracil, followed by replenishment at 20-minute intervals, with each time decreasing in increments of 5% from the last. Starting at the 240th minute, the count of replenishment is incremented by 10% from the previous one each time until the end of the coating process.

In some embodiments, the initial addition of anti-scarring drugs during deposition is 0.5 mg/ml of mitomycin-C and 40 mg/ml of 5-fluorouracil, followed by replenishment at 25-minute intervals of 10% decreasing from the previous one each time. Starting at the 720th minute, the count of each refill was increased by 15% increments from the previous one until the end of the coating process.

In some embodiments, the drainage sheet is made of a biodegradable material.

In some embodiments, the biodegradable material is pure magnesium, with a magnesium content in the pure magnesium greater than or equal to 99.99%.

In some embodiments, the magnesium content in the pure magnesium is 99.99%.

In some embodiments, the biodegradable material is a magnesium alloy, the magnesium alloy including the following components by mass percentage: 2.0-5.0% Zn, 0.0-0.5% Ca, 0.0-0.5% Sr, magnesium, and unavoidable impurity elements, and the magnesium alloy has a tensile strength greater than or equal to 200 MPa. The total content of the impurities therein does not exceed 0.01%.

In some embodiments, the magnesium alloy comprises the following components by mass percentage: 2% Zn and 0.1% Ca, magnesium, and unavoidable impurity elements, and the magnesium alloy has a tensile strength of 220 MPa.

In some embodiments, the magnesium alloy comprises the following components by mass percentage: 5% Zn, 0.5% Sr, and the magnesium alloy has a tensile strength of 280 MPa.

In some embodiments, the magnesium alloy comprises the following components by mass percentage: 4% Zn, 0.5% Ca, and the magnesium alloy has a tensile strength of 260 MPa.

The alloying elements Zn, Ca, and Sr are all biocompatible, and by reasonably controlling their contents, the strength of the aqueous humor drainage apparatus can be strengthened while ensuring that its safety is not compromised. At the same time, during the degradation process, the dissolution and release of these alloying elements may also play an auxiliary role in regulating the proliferation of fibroblasts.

In some embodiments, the magnesium alloy is preferably a medical magnesium alloy.

In some embodiments of the present disclosure, the use of a long-strip-shaped drainage sheet with uniform cross-sectional dimensions and a high-strength magnesium alloy material ensures that there is no weak part of the drainage apparatus, and at the same time enhances its strength. Therefore, instead of making a scleral tunnel specifically for this purpose, the drainage apparatus may be inserted into the eye by puncturing an incision in the sclera with a tunneling knife during the surgical procedure, thereby realizing the connectivity between the anterior chamber and the subconjunctival space and directing aqueous humor out of the eye to control IOP. With the increased strength of magnesium alloys, the drainage apparatus can be made thinner and smaller, which can help to apply the drainage apparatus to a wider range of glaucoma types, such as closed angle glaucoma. In addition, the risk of corneal endothelial loss due to continuous friction between the front end of the drainage apparatus (in the anterior chamber) and the corneal endothelial cells can also be further minimized, effectively enhancing the long-term safety of glaucoma external drainage surgery.

In some embodiments, a degradation rate of the drainage sheet in vitro in a lactated Ringer's injection solution (37° C.±0.5° C., continuous immersion for 30 days, with daily replacement of simulated aqueous humor) is 0.01-0.1 mm/month.

The aqueous humor drainage apparatus provided by embodiments of the present disclosure is made of biodegradable biomaterials, and is capable of efficiently connecting the anterior chamber to the subconjunctival space, constructing a physiologic aqueous humor drainage channel, and preventing its closure. Therefore, when the aqueous humor drainage apparatus is completely biodegraded, it can form a natural aqueous humor drainage channel (extending from the anterior chamber to the subconjunctiva or from the anterior chamber to the suprachoroidal space) without any foreign body irritation, thus improving the success rate of glaucoma surgery. It should also be appreciated that the drainage apparatus degrades gradually over time, effectively avoiding postoperative loss of corneal endothelial cells. At the same time, with the gradual degradation of the drainage apparatus, the drainage channel may gradually expand, and the count of aqueous humor drainage may gradually increase and reach a stable flow rate after the complete degradation of the drainage apparatus, thereby achieving regulation of the aqueous humor drainage rate.

One or more embodiments of the present disclosure further provide a method of preparing the above-described biodegradable glaucoma drainage apparatus having a scar gradient modulation effect, comprising the operations of 1) providing a drainage sheet; 2) preparing a surface coating solution by a liquid-phase deposition; 3) providing a prepared anti-scarring drug; and 4) placing the drainage sheet in the surface coating solution, and during the formation of the surface coating on the drainage sheet, adding the anti-scarring drug in an intermittent manner to form a surface coating with a non-monotonic change of distribution concentration on the surface of the drainage sheet.

In some embodiments, the addition of the anti-scarring drug according to intermittent addition is as follows: a certain amount of the anti-scarring drug is added at intervals of from 10 minutes to 30 minutes, with the amount of the addition being based on the concentration in the actual amount of solution, with the count of the anti-scarring drug initially maximized, then gradually decreased, and when one-half to two-thirds of the deposition time is reached, the count of the anti-scarring drug is gradually increased until the deposition is completed.

The embodiments of this manual have at least the following beneficial effects:

In some embodiments of the present disclosure, the state of the use of the aqueous humor drainage apparatus after implantation is illustrated in FIG. 1 and FIG. 2. The surgery time is significantly shortened, typically taking only 5-10 minutes; compared to existing glaucoma external device implantation surgeries, the time is shortened by a factor of 0.5-1, and the efficiency of the surgery is significantly improved. The aqueous humor drainage apparatus can greatly reduce complications such as low intraocular pressure due to leakage of aqueous humor from the scleral tunnel and poorly embedded implants, significantly shortening surgical time and effectively avoiding anesthesia failure and other hidden dangers during surgery. The drainage apparatus is able to improve fixation in the scleral tunnel, reduce leakage of aqueous humor due to the poor insertion of the scleral tunnel and the drainage apparatus, and thus reduce the probability of complications such as low intraocular pressure (IOP), shallow anterior chamber (AC), and choroidal detachment, and significantly reduces the use of viscoelastic during surgery, effectively improving the safety and effectiveness of the procedure.

During the drainage process, with the gradual degradation of the drainage sheet in the eye, an inner diameter of the drainage channel connecting the anterior chamber and the suprachoroidal cavity gradually increases, and the rate of aqueous humor drainage is gradually increased, thus effectively avoiding the risk of low IOP, shallow anterior chamber, and late bleb-related complications that may occur in the early stage of the implantation of traditional glaucoma drainage apparatuses, and the risk of late postoperative complications related to filtering blebs In the early stage of implantation of the aqueous humor drainage apparatus, the drug is gradually released as the surface coating degrades. The surface coating 13 plays a role in controlling the release of the drug, so that the count of drug released over time shows a non-monotonic curvilinear change, thereby achieving the reasonable regulation of the degree of scarring at the implantation site and ensuring that the entire aqueous humor can be effectively exported during the implantation process. Even after complete degradation of the material, there is no blockage of the channel due to excessive scarring.

Relying solely on the intrinsic gaps present on the surface of the coating to drain the aqueous humor may result in poor drainage, making it difficult to effectively reduce intraocular pressure and alleviate the patient's discomfort. In some embodiments of the present disclosure, by preparing a drainage gap on the surface of this drainage sheet using a machining or chemical etching manner, it is ensured that good drainage can be realized at the early stage of implantation. Upon initial implantation of the drainage apparatus into the eye, the device fits snugly against the sclera, and the drainage gap extends through the length of the drainage apparatus, directly connecting the anterior chamber and the subconjunctival space. As a result, once the drainage apparatus is implanted, the aqueous humor flows smoothly through the drainage gap, effectively lowering intraocular pressure and relieving patient discomfort.

By coating the surface of the magnesium alloy material with a biodegradable coating, not only does the magnesium alloy drainage apparatus slow down the degradation rate, but it also promotes the formation of natural scleral aqueous humor drainage channels. The drainage apparatus is placed between the scleral layers during surgery, and its upper and lower surfaces are in contact with the interlayer scleral tissue. The coating, the magnesium alloy substrate, and its degradation products work together to modulate fibroblast proliferation, forming a very thin fibro-proliferative membrane between the upper and lower layers of the scleral drainage channel, respectively. With the complete degradation of the drainage apparatus, the proliferation and scarring process of these two layers of fibro-proliferative membranes will stop, and the upper and lower fibro-proliferative membranes will not be able to further scar, thus forming a natural aqueous humor drainage channel, effectively avoiding blockage due to scarring in the scleral drainage channel. This significantly improves the long-term effectiveness of external drainage surgery for glaucoma.

In some embodiments of the present disclosure, the surface coating thickness can be up to 0.02 mm, allowing for a wide range of adjustments to the surface coating thickness to efficiently slow down the degradation rate of the flow-through device and modulate fibroblast proliferation. Additionally, in some embodiments of the present disclosure, a count of beneficial alloying elements have been introduced that may be used without a coating, and thus the aqueous humor drainage apparatus is capable of being adapted for use in a broader patient population.

EMBODIMENT

Embodiment 1: Preparation of a Drainage Apparatus Based on a Magnesium Alloy Material The present embodiment is based on a magnesium alloy (Mg-2Zn-0.1Ca, i.e., containing 2% Zn and 0.1% Ca by weight percent, a tensile strength of 220 MPa, and a degradation rate of 0.03 mm/month), and a drainage apparatus is prepared by the following operations:
  a. Hot extrusion treatment was performed on magnesium alloy materials.
  b. A long-strip-shaped device material with a length of 3 mm, a width of 2 mm, and a thickness of 0.3 mm was machined from the magnesium alloy material.
  c. A drainage gap running the entire length of the upper and lower surfaces of the device material was machined in the longitudinal direction, with a gap width of 0.3 mm and a depth of 0.1 mm. If there are two gaps, the drainage gaps on the two surfaces must be offset by more than 0.2 mm.
  d. The surface of the device material was sanded and polished using 400 #, 600 #, 800 #, 1200 #sandpaper.
  e. Ultrasonic cleaning was performed in acetone.
  f. After natural air drying, the process has yielded a drainage apparatus made of magnesium alloy material.

Embodiment 2: Preparation of an Aqueous Humor Drainage Apparatus Based on a Magnesium Alloy/HA Coated Composite Material A drainage apparatus made of the magnesium alloy material of Embodiment 1 is used as a substrate, the drainage sheet was placed in a surface coating solution in a temperature range of 40° C. to 100° C., and an anti-scarring drug was added to the surface coating solution by the coating-synchronized drug loading manner. A hydroxyapatite (HA) coating with an anti-scarring drug was formed by an electrochemical deposition technique at a current density of 10 mA/cm$^2$ for 2 hours at room temperature.

In this case, the surface coating solution was an aqueous solution of 0.042 mol/L $(Ca(NO_3)_2)$ and 0.025 mol/L $(NH_4H_2PO_4)$ with a Ca/P ratio of 1.68 and a pH of 5.0. During the deposition process, the initial addition of the anti-scarring drug was 1 mg/ml of mitomycin-C, which was then supplemented at 10-minute intervals, each time decreasing by 10% from the last. Starting at the 50th minute, the count of replenishment was incremented by 15% from the previous one each time until the end of the coating process. After ultrasonic cleaning, the final drug-carrying coating thickness obtained was 0.004 mm for the magnesium alloy/HA coated composite-based aqueous humor drainage apparatus. The degradation rate of this drainage apparatus was 0.06 mm/month.

Embodiment 3: Preparation of an Aqueous Humor Drainage Apparatus Based on Magnesium Alloy/Tricalcium Phosphate Coating Material In this embodiment, a drainage apparatus is prepared based on a magnesium alloy (Mg-5Zn-0.5Sr, tensile strength 280 MPa, degradation rate 0.05 mm/month) by the following operations:

a. Hot extrusion treatment was performed on magnesium alloy materials.
b. A long-strip-shaped device material with a length of 1 mm, a width of 0.5 mm, and a thickness of 0.1 mm was machined from the magnesium alloy material.
c. A drainage gap running the entire length of the upper and lower surfaces of the device material is machined in the longitudinal direction, with a gap width of 0.1 mm and a depth of 0.05 mm. If there are two gaps, the drainage gaps on the two surfaces must be offset by more than 0.2 mm.
d. The surface of the device material was sanded and polished using 400 #, 600 #, 800 #, 1200 #sandpaper.
e. Ultrasonic cleaning was performed in acetone.
f. After natural air drying, the process has yielded a drainage apparatus made of magnesium alloy material.
g. Based on the magnesium alloy material drainage apparatus prepared above as a substrate, this drainage sheet was placed in a surface coating solution in a temperature range of 40° C. to 100° C., and anti-scarring drugs were added to the surface coating solution using the coating-synchronized drug loading manner by a chemical deposition technique at 60° C. for 24 h to prepare tricalcium phosphate coating. In this case, the surface coating solution was an aqueous humor solution of 0.075 mol/L $(Ca(NO_3)_2)$ and 0.05 mol/L $(Na_2HPO_4)$ with a Ca/P molar ratio of 1.5. During the deposition process, the anti-scarring drug was initially added as 100 mg/ml of 5-fluorouracil, and then replenished at 30-minute intervals, with each time decreasing by 5% from the last. Starting at the 720th minute, the count of replenishment was increased by 10% each time in increments from the previous one until the end of the coating process. After ultrasonic cleaning, the final drug-carrying coating thickness obtained was 0.02 mm for the magnesium alloy/tricalcium phosphate coated material based on the aqueous humor drainage apparatus.

Embodiment 4: Preparation of an Aqueous Humor Drainage Apparatus Based on a Magnesium Alloy/Calcium Phosphate Coating Material In this embodiment, a drainage apparatus is prepared based on a magnesium alloy (Mg-4Zn-0.5Ca, tensile strength 260 MPa, degradation rate 0.075 mm/month) by the following operations:

a. Hot extrusion treatment was performed on magnesium alloy materials.
b. A long-strip-shaped device material with a length of 3 mm, a width of 1.5 mm and a thickness of 0.2 mm was machined from the magnesium alloy material.
c. A drainage gap running the entire length of the upper and lower surfaces of the device material was machined in the longitudinal direction, with a gap width of 0.2 mm and a depth of 0.05 mm. If there are two gaps, the drainage gaps on the two surfaces must be offset by more than 0.2 mm.
d. The surface of the device material was sanded and polished using 400 #, 600 #, 800 #, 1200 #sandpaper.
e. Ultrasonic cleaning was performed in acetone.
f. After natural air drying, the process has yielded a drainage apparatus made of magnesium alloy material.
g. Based on the magnesium alloy material drainage apparatus prepared above as a substrate, this drainage sheet was placed in a surface coating solution in a temperature range of 40° C. to 100° C., and anti-scarring drugs were added to the surface coating solution using the coating-synchronized drug loading manner by a chemical deposition technique at 50° C. for 10 h to prepare dicalcium phosphate (DCP) coating. In this case, the surface coating solution was an aqueous humor solution of 0.032 mol/L $(Ca(NO_3)_2)$ and 0.022 mol/L $(Na_2HPO_4)$ with a Ca/P molar ratio of 1.45. In this case, the surface coating solution was an aqueous humor solution of 0.032 mol/L $(Ca(NO_3)_2)$ and 0.022 mol/L $(Na_2HPO_4)$ with a Ca/P molar ratio of 1.45. During the deposition process, the anti-scarring drugs were initially added as 0.1 mg/ml of mitomycin C and 80 mg/ml of 5-fluorouracil, and then replenished at 20-minute intervals, with each time decreasing by 5% from the last. Starting at the 240th minute, the count of replenishment was increased by 10% each time in increments from the previous one until the end of the coating process. After ultrasonic cleaning, the final drug-carrying coating thickness obtained was 0.01 mm for the magnesium alloy/dicalcium phosphate-coated material based on the aqueous humor drainage apparatus.

Embodiment 5: Preparation of a Drainage Apparatus Based on Pure Magnesium/(Hydroxyapatite) Coated Material The present embodiment is based on pure magnesium (99.99% Mg, degradation rate of 0.02 mm/month) to prepare a drainage apparatus by the following operations:

a. Cold extrusion followed by recrystallization annealing treatment was performed on pure magnesium material.
b. A long-strip-shaped device material with a length of 2.8 mm, a width of 1.5 mm, and a thickness of 0.4 mm was machined from the magnesium alloy material.
c. A drainage gap running the entire length of the upper and lower surfaces of the device material was machined in the longitudinal direction, with a gap width of 0.2 mm and a depth of 0.08 mm. If there are two gaps, the drainage gaps on the two surfaces must be offset by more than 0.2 mm.
d. The surface of the device material was sanded and polished using 400 #, 600 #, 800 #, 1200 #sandpaper.
e. Ultrasonic cleaning was performed in acetone.
f. After natural air drying, the process has yielded a drainage apparatus made of pure magnesium material.
g. Based on the pure magnesium material drainage apparatus prepared above as a substrate, this drainage sheet was placed in a surface coating solution in a temperature range of 40° C. to 100° C., and anti-scarring drugs were added to the surface coating solution using the coating-synchronized drug loading manner by a chemical deposition technique at 95° C. for 15 h to prepare hydroxyapatite coating. In this case, the surface coating solution was a mixed solution of 0.35 mol/L ($C_{10}H_{12}CaN_2Na_2O_8 \cdot 2H_2O$, EDTA-Ca) and 0.45 mol/L ($KH_2PO_4$), with the pH adjusted to 7.3 using a NaOH solution. During the deposition process, the anti-scarring drugs were initially added as 0.5 mg/ml of mitomycin C and 40 mg/ml of 5-fluorouracil, and then replenished at 25-minute intervals, with each time decreasing by 10% from the last. Starting at the 400th minute, the count of replenishment was increased by 15% each time in increments from the previous one until the end of the coating process. After ultrasonic cleaning, the final drug-carrying coating thickness obtained was 0.008 mm for the pure magnesium/hydroxyapatite coated material drainage apparatus.

Aqueous Humor Concentration of the Drainage Apparatus 2 Months after Implantation For the aqueous humor drainage apparatuses of the above-mentioned embodiments (1, 2, 3, and 4), while introducing contrasting values (conventional trabeculectomy, medical titanium alloy), the concentration of aqueous humor after 2 months of implantation in the body was measured by using a fully automated biochemical analyzer.

aqueous humor drainage fittings provided in the present disclosure do not have a significant effect on changes in ion concentrations in the anterior chamber during intraocular biodegradation.

Effects of Mg-2Zn-0.1Ca/HA Drainage Apparatuses on Scar Formation

Figure 5:
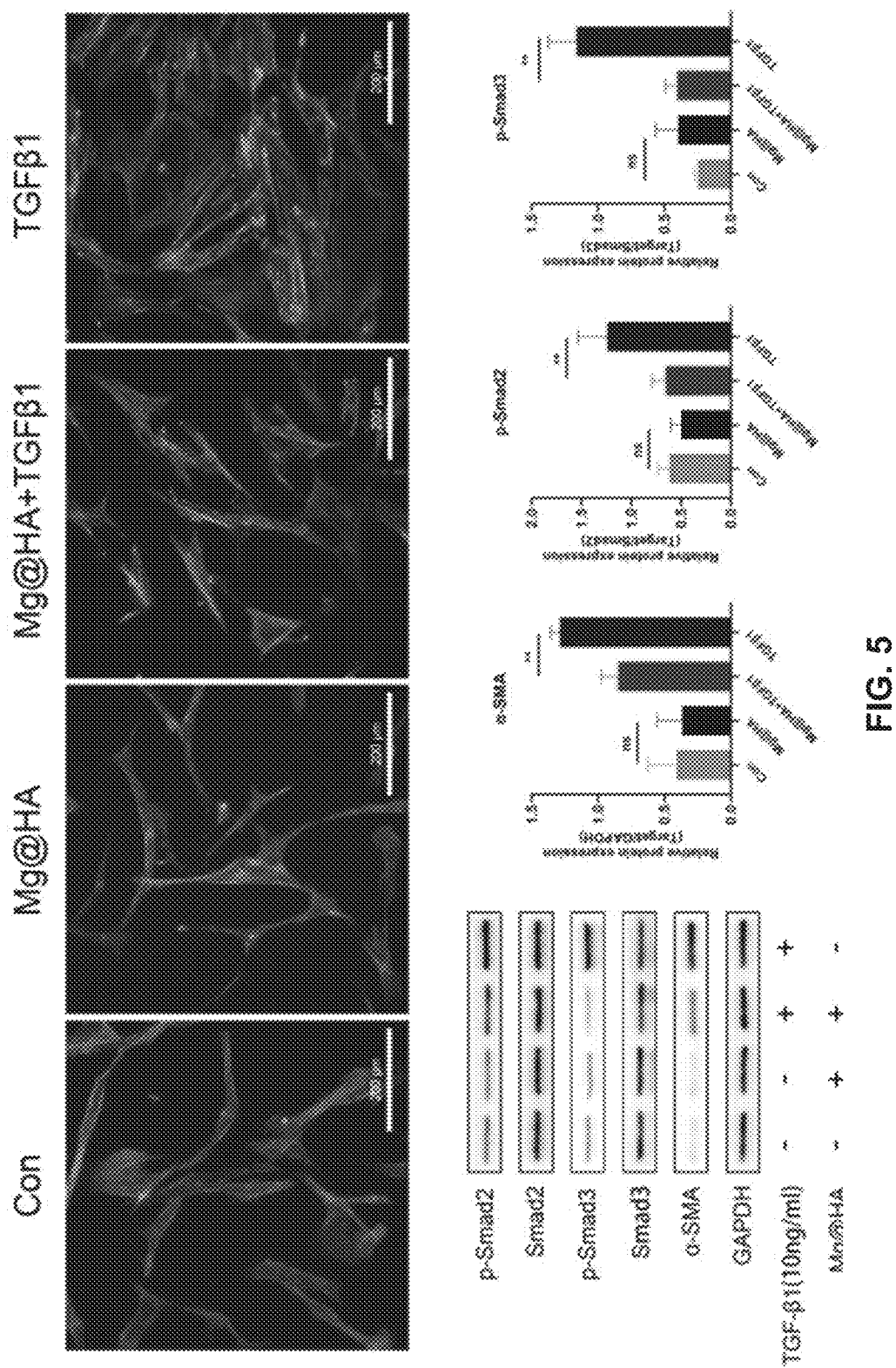
FIG. 5 is a schematic diagram illustrating effect of a drainage apparatus on scar formation according to some embodiments of the present disclosure.

Taking an aqueous humor drainage apparatus prepared in embodiment 2 as an example, the effect of the aqueous humor drainage apparatus to the scar formation is tested, the sample preparation and testing operations include:
(1) Protein extraction and immunoprotein blotting (Western blot)
(2) Protein extraction;
(3) Protein concentration assay;
(4) Preparation of electrophoresis gel
(5) Electrophoresis
(6) Transfilm
(7) Fixation and antibody incubation
(8) Luminescence identification
(9) Analysis of results Results are as shown in FIG. 5, the Mg-2Zn-0.1Ca/HA degradation product inhibits α-SMA in Tenon's fibroblasts by mediating the TGFβ/Smad signaling pathway expression.

Degradation of Drainage Apparatuses at Different Times

Taking the aqueous humor drainage apparatus prepared in embodiment 5 as an example, its degradation in vivo was tested, and the specific operations of the test were as follows:
(1) At 1 month postoperatively, the connectivity of the drainage apparatus in the anterior chamber and the subconjunctival space, and its degradation status, were measured using ultrasound biomicroscopy (UBM).

Figure 6:
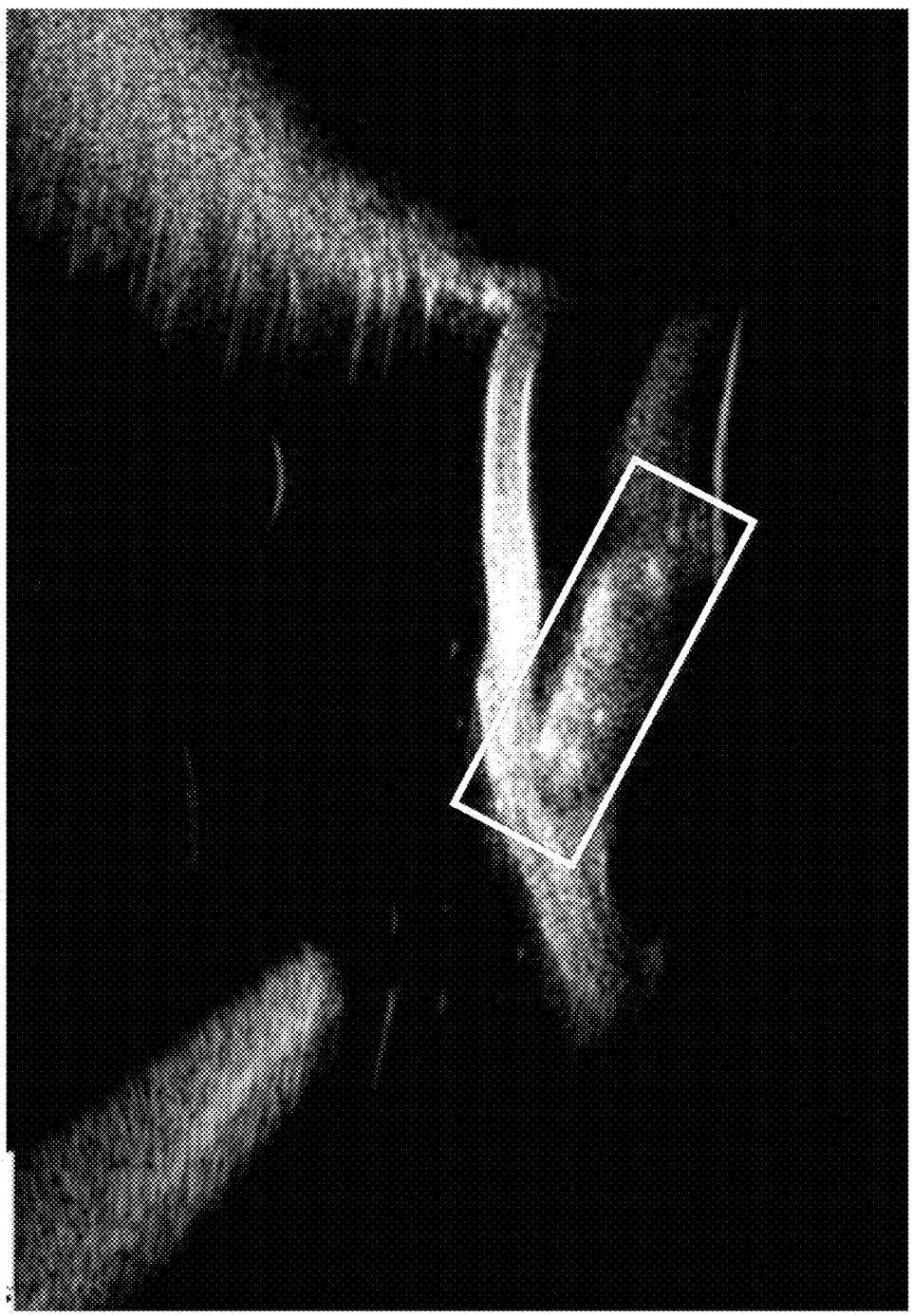
FIG. 6 is a schematic diagram illustrating a degradation of a drainage apparatus after implantation into an eyeball according to some embodiments of the present disclosure.

FIG. 6 demonstrates the connectivity of the drainage apparatus in the anterior chamber to the subconjunctival space at 1 month postoperatively, taken using the UBM (New Zealand white rabbit). According to FIG. 6, the drainage apparatus is well anchored in the scleral tunnel, with one end located in the anterior chamber and the other in the subconjunctival space, and the filtering bleb bulge is evident.

(2) At 6 months postoperatively, the ocular tissues at the site of implantation of the drainage apparatus were examined by HE staining of sections.

Figure 7:
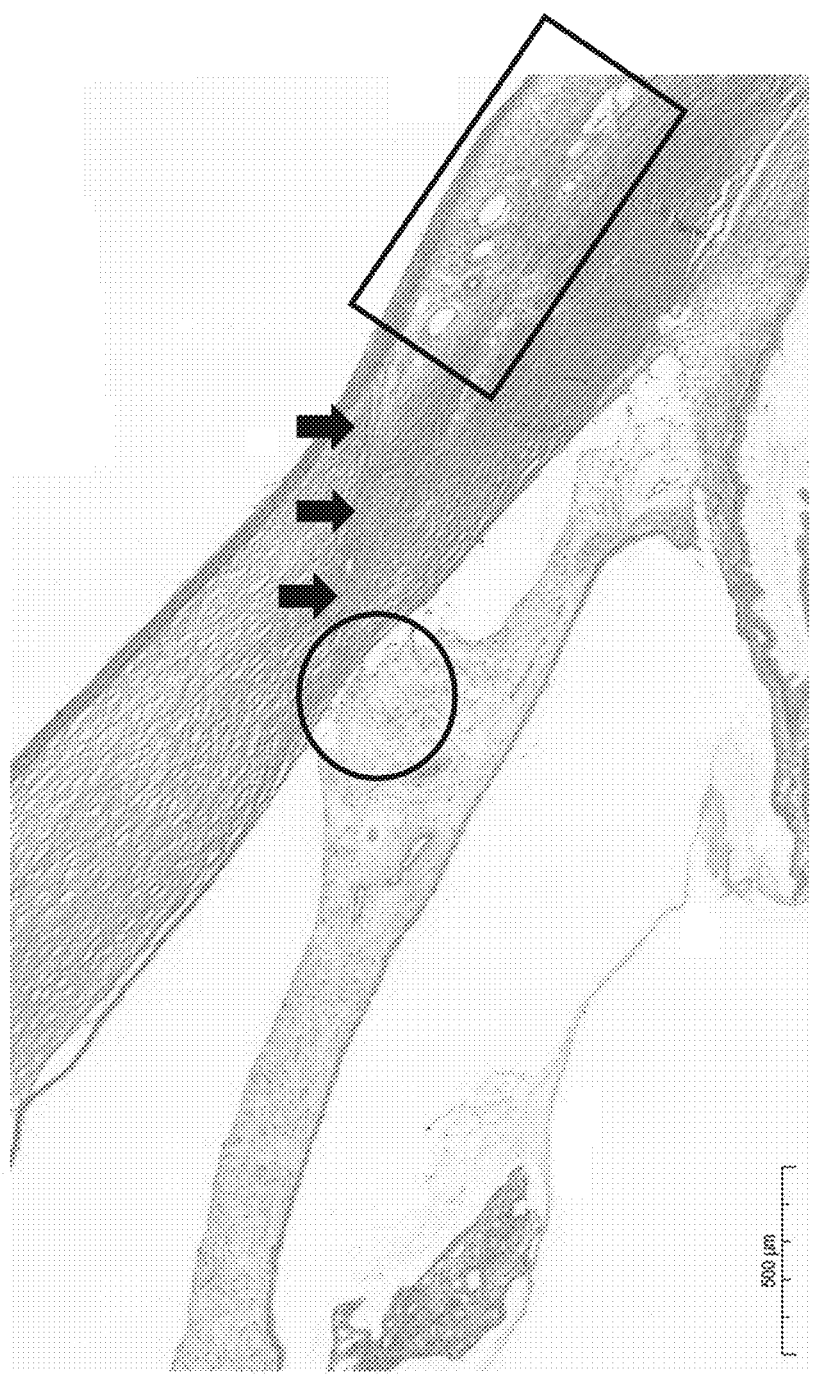
FIG. 7 is a schematic diagram illustrating Hematoxylin and Eosin staining (HE staining) of a drainage apparatus after implantation into an eyeball according to some embodiments of the present disclosure.

FIG. 7 demonstrates the results of HE staining of ocular tissue sections at 6 months postoperatively (New Zealand white rabbit). According to FIG. 7, the drainage apparatus has completely degraded, the linear aqueous humor drainage

TABLE 1

Comparison of aqueous humor ion concentrations 2 months after surgery

| | K | Na | Cl | Ca | P | Mg |
|---|---|---|---|---|---|---|
| Trabeculectomy | 4.78 ± 0.12 | 151.18 ± 6.10 | 116.05 ± 6.32 | 1.75 ± 0.11 | 0.81 ± 0.15 | 0.59 ± 0.06 |
| Medical Titanium Alloy | 4.73 ± 0.34 | 151.68 ± 8.17 | 115.83 ± 8.21 | 1.85 ± 0.13 | 0.89 ± 0.13 | 0.57 ± 0.03 |
| Mg—2Zn—0.1Ca | 4.90 ± 0.09 | 150.85 ± 6.83 | 118.17 ± 3.92 | 1.76 ± 0.13 | 0.80 ± 0.13 | 0.60 ± 0.04 |
| Mg—2Zn—0.1Ca/HA | 4.91 ± 0.11 | 153.70 ± 5.20 | 116.33 ± 8.52 | 1.80 ± 0.11 | 0.81 ± 0.14 | 0.57 ± 0.05 |
| Mg—5Zn—0.5Sr/TCP | 4.77 ± 0.17 | 153.70 ± 6.25 | 115.83 ± 10.74 | 1.84 ± 0.13 | 0.86 ± 0.20 | 0.58 ± 0.05 |
| Mg—4Zn—0.5Ca/DCP | 4.79 ± 0.15 | 152.17 ± 10.11 | 119.5 ± 5.58 | 1.79 ± 0.14 | 0.83 ± 0.20 | 0.59 ± 0.04 |
| HA—Mg | 4.63 ± 0.32 | 149.6 ± 2.18 | 116.1 ± 3.69 | 2.01 ± 0.17 | 0.83 ± 0.19 | 0.65 ± 0.04 |
| P Value | 0.474 | 0.971 | 0.939 | 0.685 | 0.918 | 0.797 |

According to the data in Table 1, the composition of the aqueous humor after implantation of the aqueous humor drainage apparatus prepared in embodiments 1 to 4 above into the eye was compared to the control group which had trabeculectomy and titanium implantation only. No significant difference indicates that the degradation products of the channel is clearly visible, and the filtering blebs are bulging with sparse microvesicle-like tissue formation. Simultaneously, anterior synechiae of the iris can be observed. No significant inflammatory cell infiltration was found in any of the tissue sections. In this figure, the arrows indicate the drainage channels; the circle marks the area of anterior iris synechiae; and the rectangle frames the elevated filtering blebs and microcystic-like structures.

Effect of Drainage Apparatuses on Intraocular Pressure

Aqueous humor drainage apparatus implantation (Mg Plate group) and trabeculectomy (Trabeculectomy group) prepared in embodiment 1 were performed on New Zealand white rabbits, respectively. Eyes without surgery (Control group) served as a blank control group.

Figure 8:
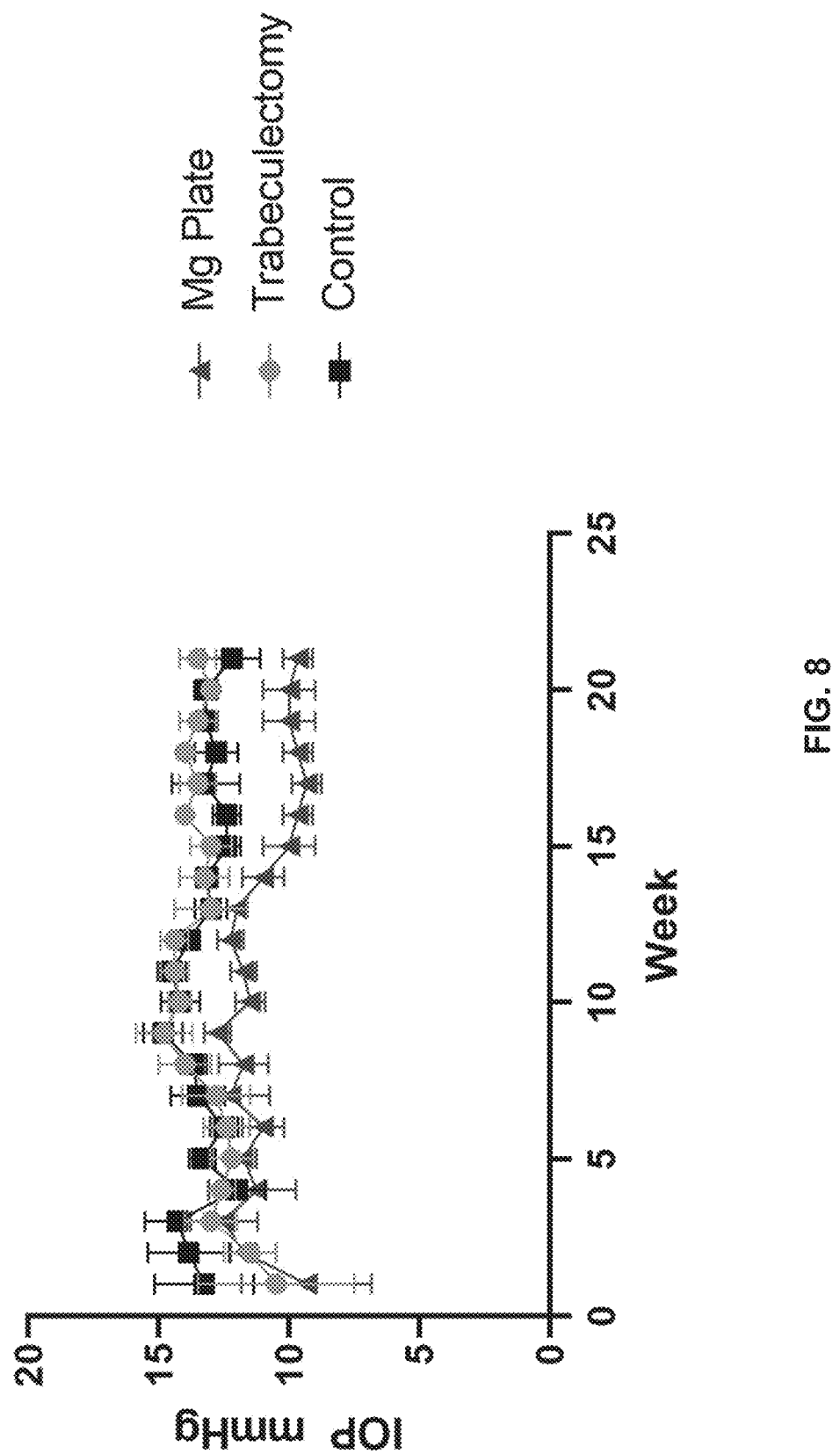
FIG. 8 is a schematic diagram illustrating an intraocular pressure fluctuation of a drainage apparatus after implantation into the eyeball according to some embodiments of the present disclosure.
Figure 10A:
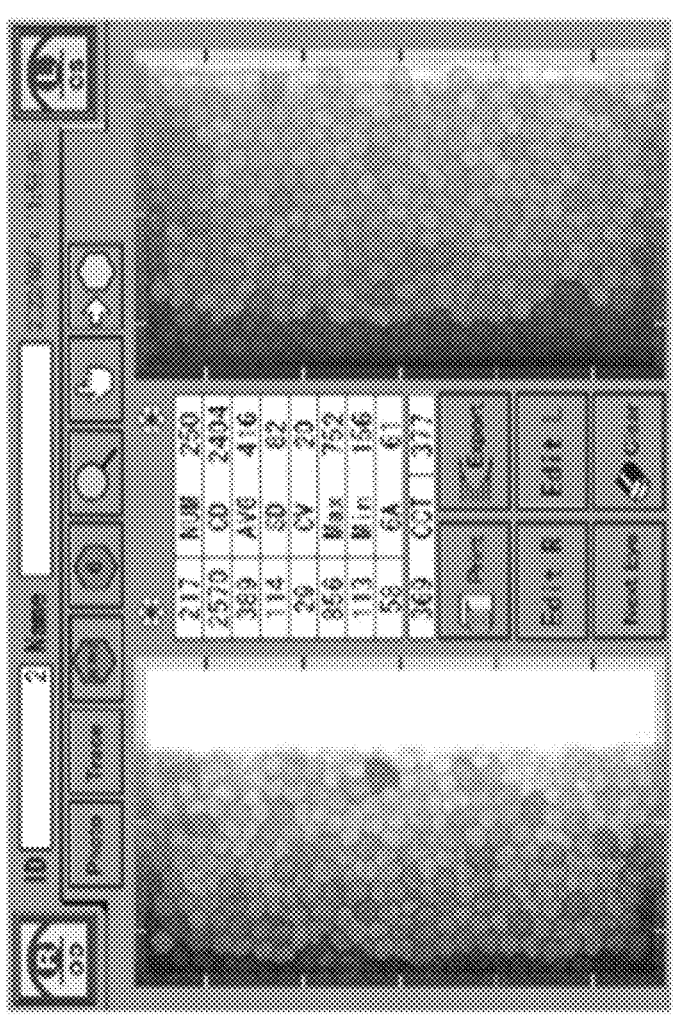
Figure 10B:
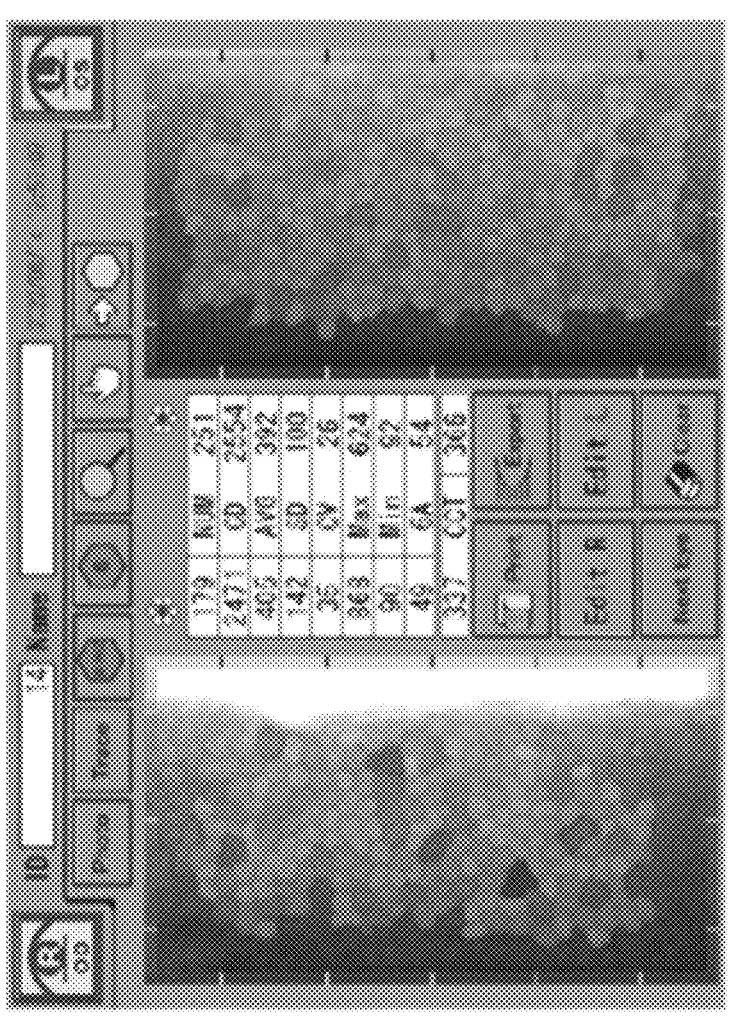
Figure 10C:
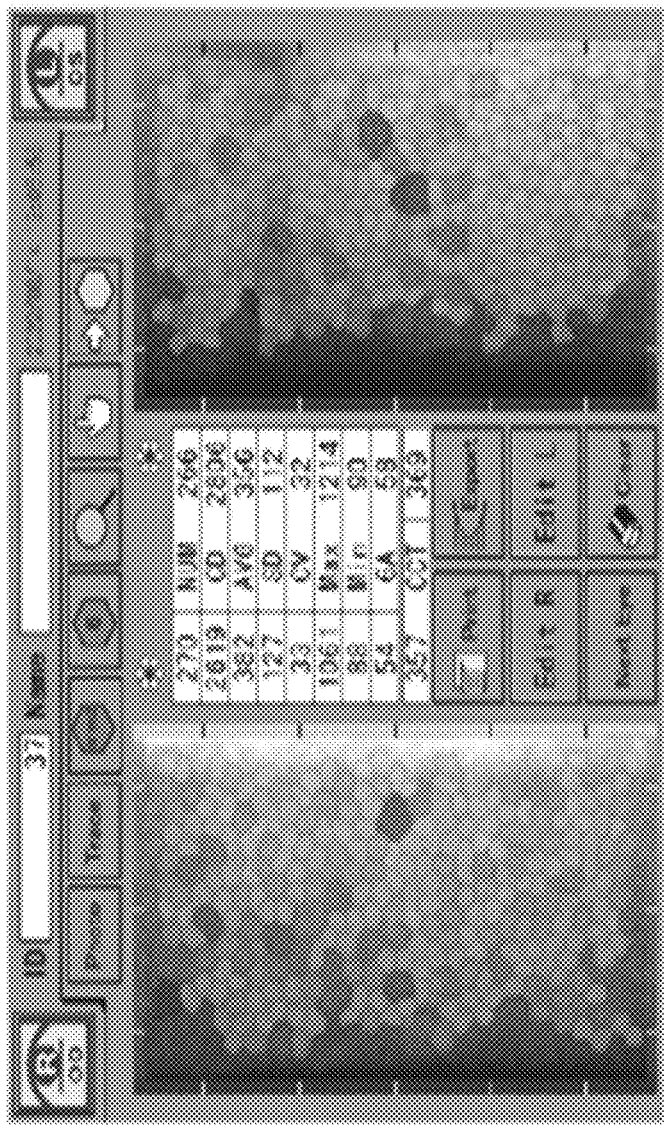
Figure 10D:
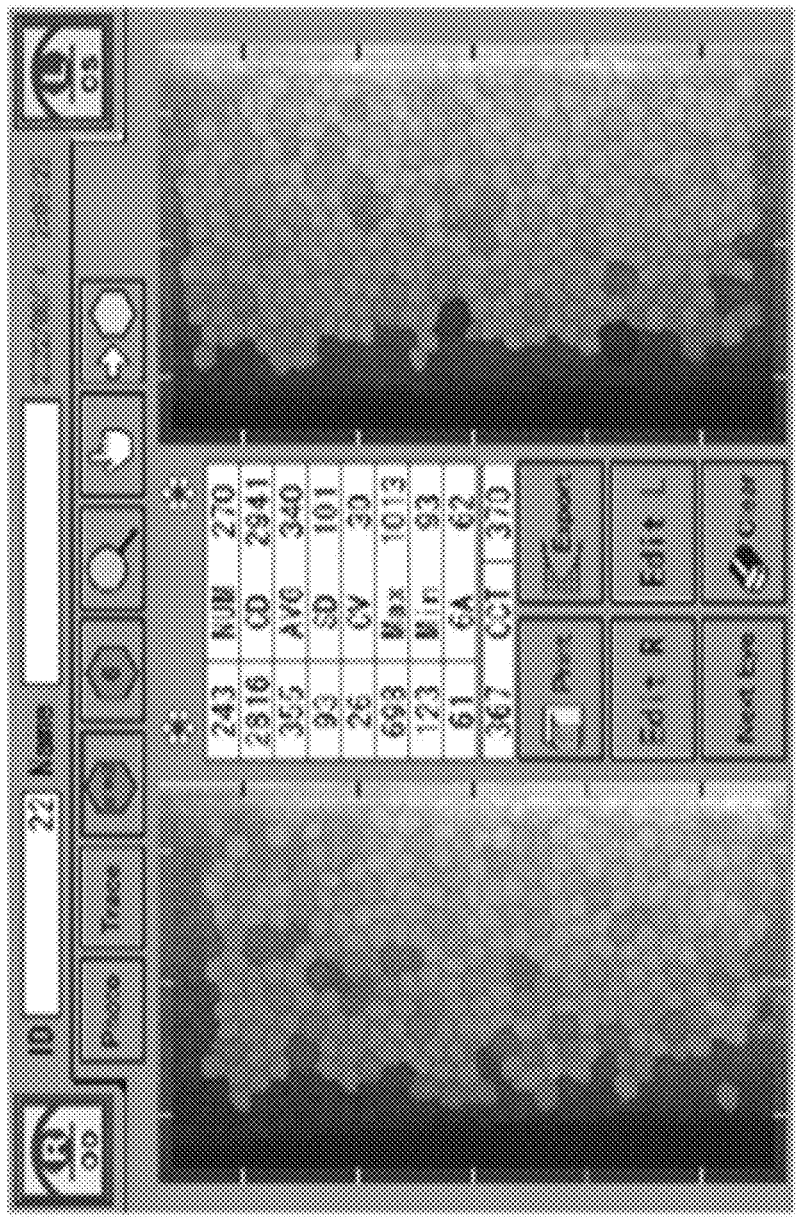

Weekly intraocular pressure tests were performed with a Tonopen tonometer, and the average of three IOP values was taken and recorded. As shown in FIG. 8, the IOP changes were observed for five consecutive months after the operation, and the IOP values of the Mg Plate group and the Trabeculectomy group were lower than those of the control group in the first month, and subsequently the IOP levels of the Trabeculectomy group returned to those of the control group, indicating that the drainage channel had completely healed. However, IOP levels in the Mg Plate group were consistently and significantly lower than those in the Trabeculectomy group and the control group. From the third postoperative month, the IOP in the Mg Plate group decreased further until the fifth postoperative month, indicating that with the biodegradation of the drainage apparatus, the physiological drainage channel gradually expanded, and the count of aqueous humor drainage gradually increased, resulting in a stable scleral aqueous humor drainage channel.

Aqueous humor drainage apparatus implantation (Mg Plate group) and trabeculectomy (Trabeculectomy) prepared in embodiment 5 were performed on New Zealand white rabbits, respectively. Eyes without surgery (Control group) served as a blank control group.

Daily rows of intraocular pressure measurements were taken in New Zealand white rabbits using a Tonopen tonometer one week before the experiment. Preoperative baseline data showed that IOP fluctuated in the range of 12-15 mmHg, and the difference in IOP was less than 5 mmHg in both eyes. Postoperatively, IOP was monitored weekly for 21 weeks. The results are shown in Table 2. One-way ANOVA analysis of the changes in IOP among the three groups revealed that there was a statistically significant difference in the changes in IOP among the groups at different time points (p<0.05). For the first 5 weeks postoperatively, IOP values were lower in both the Mg Plate and Trabeculectomy groups than in the Control group. From week 6, the IOP in the Trabeculectomy group basically rebounded to the Control group level. The Mg Plate group had consistently lower IOP levels than the Trabeculectomy group and Control group in the postoperative period, and from 15-16 weeks postoperatively, IOP was further reduced.

TABLE 2

Postoperative intraocular pressure monitoring results and analysis

| Time (weeks) | Intraocular pressure (mmHg) | | | F value | P value |
| --- | --- | --- | --- | --- | --- |
| | Mg Plate group | Trabeculectomy group | Control group | | |
| Week 1 | 9.33 ± 1.92 | 10.67 ± 2.21 | 13.33 ± 1.416 | 11.635 | 0.000 |
| Week 2 | 11.00 ± 0.94 | 11.16 ± 0.62 | 14.00 ± 0.96 | 32.689 | 0.000 |
| Week 3 | 12.55 ± 0.71 | 12.33 ± 0.60 | 14.25 ± 0.75 | 19.502 | 0.000 |
| Week 4 | 11.00 ± 0.79 | 12.50 ± 0.35 | 13.00 ± 1.02 | 11.228 | 0.000 |
| Week 5 | 11.67 ± 0.42 | 12.33 ± 0.30 | 13.41 ± 0.51 | 33.091 | 0.000 |
| Week 6 | 11.16 ± 0.50 | 12.66 ± 0.79 | 12.42 ± 0.68 | 9.108 | 0.001 |
| Week 7 | 12.16 ± 0.86 | 13.00 ± 0.99 | 13.42 ± 0.73 | 4.567 | 0.023 |
| Week 8 | 11.67 ± 0.37 | 14.00 ± 0.59 | 13.75 ± 0.43 | 50.122 | 0.000 |
| Week 9 | 12.67 ± 0.56 | 14.67 ± 0.73 | 14.75 ± 0.35 | 35.772 | 0.000 |
| Week 10 | 11.50 ± 0.28 | 14.17 ± 0.28 | 14.42 ± 0.18 | 136.041 | 0.000 |
| Week 11 | 11.83 ± 0.55 | 14.33 ± 0.21 | 14.16 ± 0.50 | 60.299 | 0.000 |
| Week 12 | 12.17 ± 0.18 | 14.33 ± 0.63 | 13.83 ± 0.61 | 27.027 | 0.000 |
| Week 13 | 11.83 ± 0.75 | 13.16 ± 1.05 | 13.00 ± 0.43 | 6.962 | 0.005 |
| Week 14 | 11.00 ± 0.47 | 13.50 ± 0.69 | 13.33 ± 0.57 | 38.495 | 0.000 |
| Week 15 | 10.00 ± 0.56 | 13.00 ± 0.47 | 12.66 ± 0.47 | 61.766 | 0.000 |
| Week 16 | 9.66 ± 0.47 | 13.66 ± 0.92 | 12.83 ± 0.52 | 70.982 | 0.000 |
| Week 17 | 9.33 ± 0.30 | 13.60 ± 0.43 | 13.54 ± 0.64 | 140.881 | 0.000 |
| Week 18 | 9.60 ± 0.28 | 13.80 ± 0.60 | 13.30 ± 0.62 | 92.953 | 0.000 |
| Week 19 | 10.00 ± 0.53 | 13.60 ± 0.36 | 13.50 ± 0.42 | 122.755 | 0.000 |
| Week 20 | 9.80 ± 0.45 | 13.40 ± 0.28 | 13.30 ± 0.33 | 191.601 | 0.000 |
| Week 21 | 10.00 ± 0.24 | 13.60 ± 0.55 | 12.80 ± 0.50 | 86.256 | 0.000 |

Effects of Drainage Apparatuses on Corneal Endothelial Cell Compensation:

Taking the aqueous humor drainage apparatus prepared in embodiment 1 as an example, the effect after the implantation of the aqueous humor drainage apparatus on corneal endothelial cell was tested. Neither rabbit 14 nor rabbit 2 underwent any surgical treatment in the left eye; rabbit 14 underwent surgery for the drainage apparatus in the right eye, and rabbit 2 underwent trabeculectomy in the right eye. At 5 months postoperatively, corneal endothelial cells were measured using a corneal endothelial cytometer (EM-3000, TOMEY, Japan), and the results are shown in FIG. 9. No significant differences in corneal endothelial cell number, density, and morphology were observed in the right and left eyes of both rabbits.

Taking the aqueous humor drainage apparatus prepared in embodiment 5 as an example, the effect after the implantation of the aqueous humor drainage apparatus on corneal endothelial cell was tested. At 5 months postoperatively, the corneal endothelial cells were measured using a corneal endothelial cytometer, and the results are shown in FIG. 10(*a*), (*b*), (*c*), and (*d*). The aqueous humor drainage apparatus implantation group had similar corneal endothelial cell density and morphology compared to the contralateral non-surgical group. A paired-samples T test on the number of corneal endothelial cells between the two groups yielded a P value of 0.857, indicating that there was no statistically significant difference between the two groups (N=5).

Effect of Drainage Apparatuses on Aqueous Humor Drainage

Taking the aqueous humor drainage apparatus prepared in embodiment 1 as an example, the effect after the implantation of the aqueous humor drainage apparatus on aqueous humor drainage was tested, and the specific operations were as follows: at 1, 2, 3, 4, and 5 months postoperatively, the anterior chamber of the experimental animals was injected with anterior capsule membrane stain (Trypan blue) to observe whether the stain was drained into the subconjunctival space and to assess its dispersion range, thereby determining the effective drainage area size.

Figure 11:
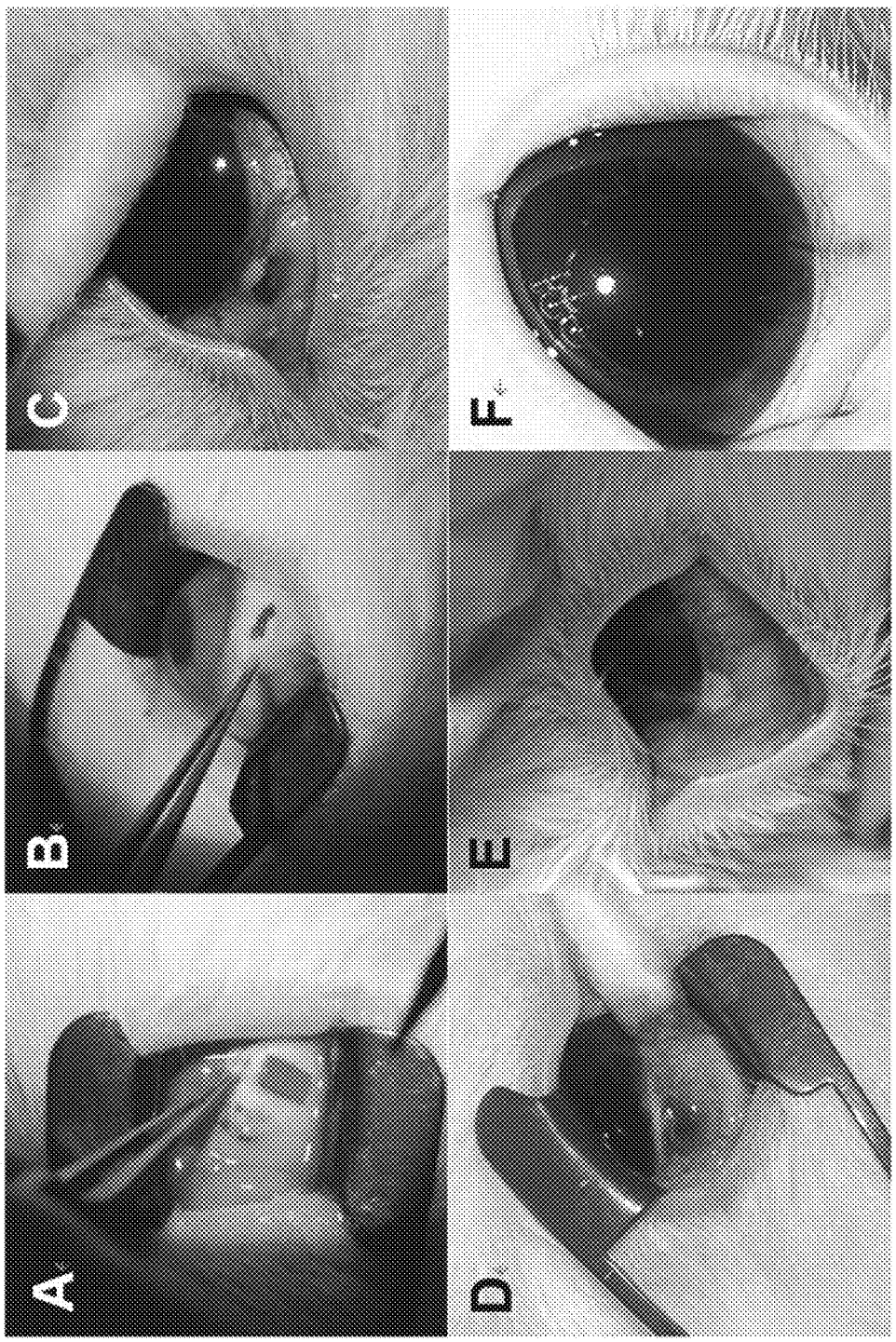
FIG. 11 and FIG. 12 are schematic diagrams illustrating an aqueous humor drainage condition of a drainage apparatus after implantation into an eyeball according to some embodiments of the present disclosure.

Stain drainage is shown in FIGS. 11. A and B show the post-implantation status of the drainage apparatus; C shows aqueous humor drainage at 1 month postoperatively; D shows aqueous humor drainage at 5 months postoperatively; E presents simple trabeculectomy at 1 month postoperatively of the aqueous humor drainage; F shows aqueous humor drainage from a conventional drain at 5 months postoperatively.

According to FIG. 11, at 1 month postoperatively, when Trypan blue was injected into the anterior chamber, the drainage apparatus group showed significant blue staining being diverted to the subconjunctiva, whereas no blue staining was seen in the conjunctiva of the trabeculectomy group (Group E), indicating that the aqueous humor drainage channel had completely healed. At 5 months postoperatively, when Trypan blue was injected into the anterior chamber, blue staining was still visible in the subconjunctiva of the drainage apparatus group. Its diffusion area was significantly larger than that observed with the drainage apparatus at 1 month postoperatively and with the traditional drainage tube at 5 months postoperatively. This suggests that as the drainage apparatus degraded, the area of the scleral aqueous humor drainage channel gradually expanded, and the channel did not undergo scarring and healing. As a result, the drainage channel was maintained.

Figure 12:
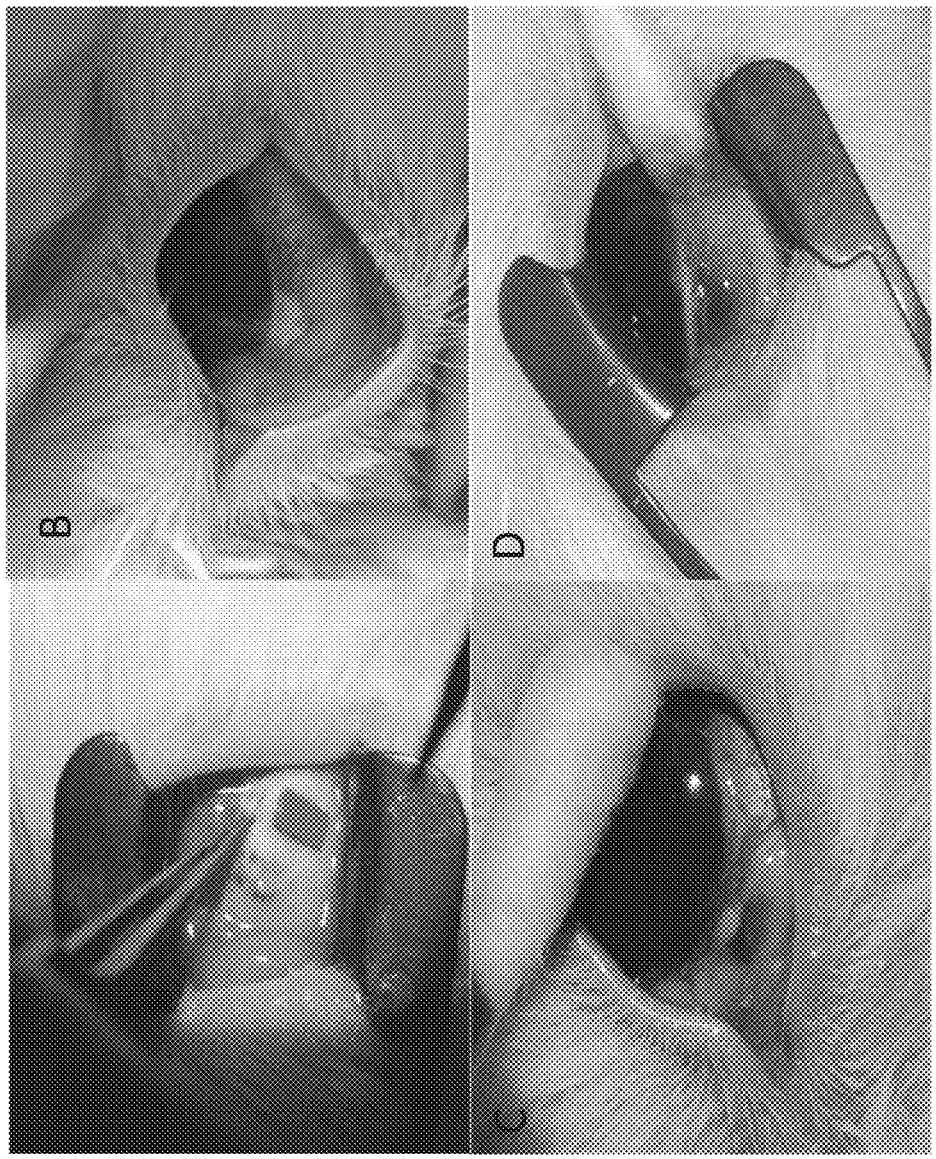

Taking the aqueous humor drainage apparatus prepared in embodiment 5 as an example, the effect after the implantation of the aqueous humor drainage apparatus on aqueous humor drainage was tested. As shown in FIG. 12, A demonstrates the post-implantation state of the drainage apparatus. In the trabeculectomy group, no subconjunctival leakage of blue stain was seen when Trypan blue was injected into the anterior chamber at 1 month postoperatively (B), and all New Zealand White rabbits in the trabeculectomy group were examined for channel patency from 1 month postoperatively, and no stain was seen to be drained into the subconjunctival. In the drainage apparatus implantation group at 1 month postoperatively, the ends of the drainage sheet were seen to be located in the anterior chamber and subconjunctivally, and the blue stain was diverted subconjunctivally after injection of Trypan blue in the anterior chamber (C). At 5 months postoperatively, the drainage apparatus had completely degraded and absorbed, and the blue stain was still visible under the conjunctival filtering bleb after re-injection of Trypan blue in the anterior chamber (D).

Effects of Drainage Apparatuses on Aqueous Humor Drainage

Taking the aqueous humor drainage apparatus prepared in embodiment 2 as an example, the cumulative release rate of mitomycin-C and the concentration of the released drug per week was tested. A coating material containing mitomycin-C was taken, dialysis clamped, and placed in a 2 mL pH 7.4 PBS buffer. Shock-immersion was carried out continuously for 24 h in an air-bath shaker at 37° C., 100 r/min. Subsequently, the leachate was aspirated and the dialysis bag and tubes were rinsed with PBS solution 3 times every 2-3 days. The immersion was continued by replacing the PBS solution with new one. Leachate was collected weekly during immersion and stored at 4° C. Also, standard PBS solution was used as a control group. The concentration of the drug in each specimen was obtained by measuring the UV spectrophotometric values of the leachate collected at each time point and calculating it using a standard curve.

Figure 13:
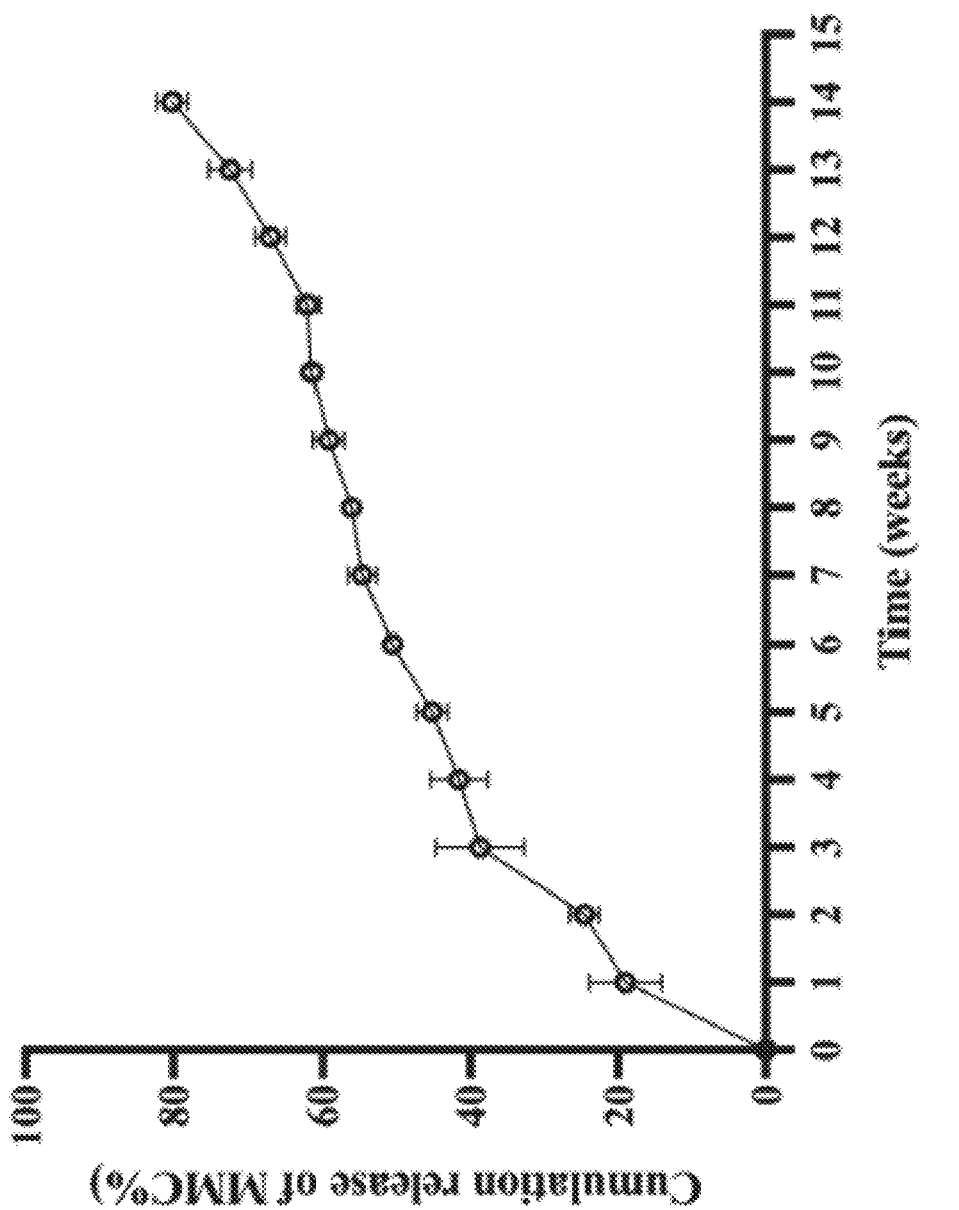
FIG. 13 is a schematic diagram illustrating a release rate of mitomycin-C in a drainage apparatus according to some embodiments of the present disclosure.
Figure 14:
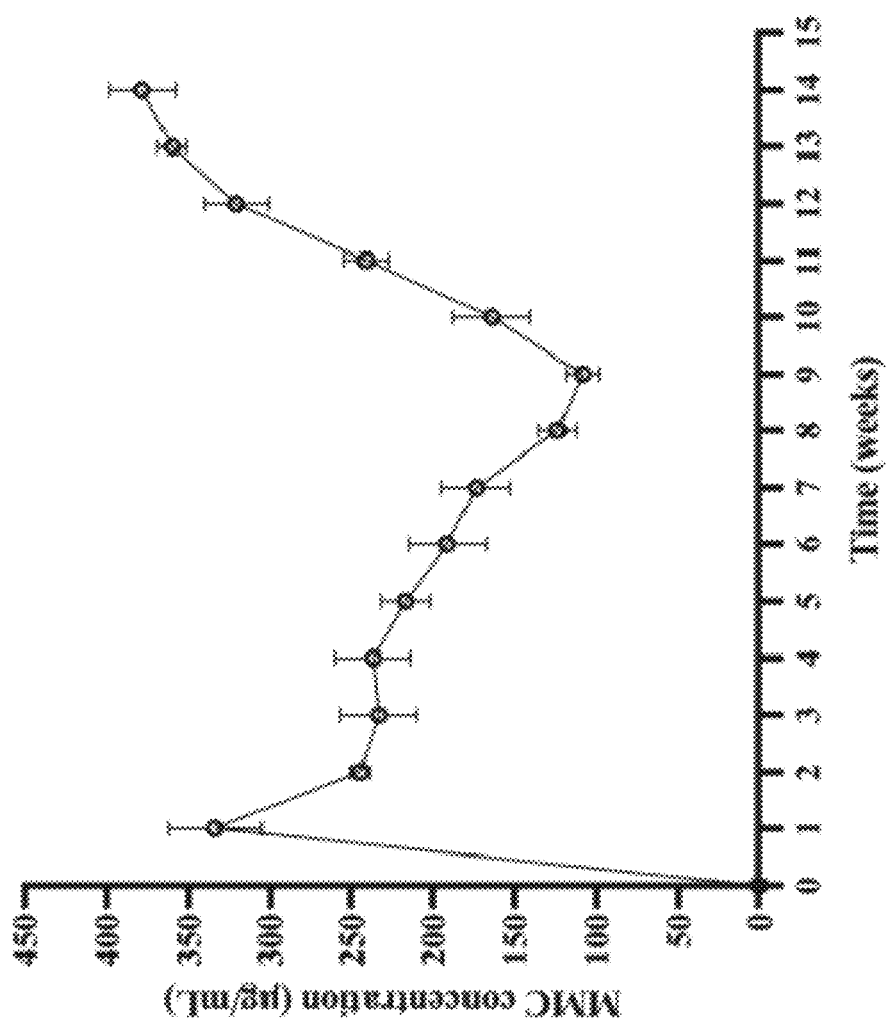
FIG. 14 is a schematic diagram illustrating a weekly release concentration of mitomycin-C in a drainage apparatus according to some embodiments of the present disclosure.

By examining the cumulative release rate of mitomycin-C and the weekly release of drug concentration, it was found that the cumulative release rate increased rapidly during the first week, with a rapid increase in drug concentration. Subsequently, the rate of drug release decreased and the curve leveled off, with a corresponding slowdown in the increase in cumulative release rate. After week 9, the release rate of mitomycin-C was seen to increase again, with a second release peak, a further increase in drug concentration, and a corresponding increase in the cumulative release rate. Mainly because the coating was completely degraded, resulting in a large amount of mitomycin-C release. The release rate of mitomycin-C is shown in FIG. 13, and the concentration of weekly release of mitomycin-C is shown in FIG. 14.

Figure 15:
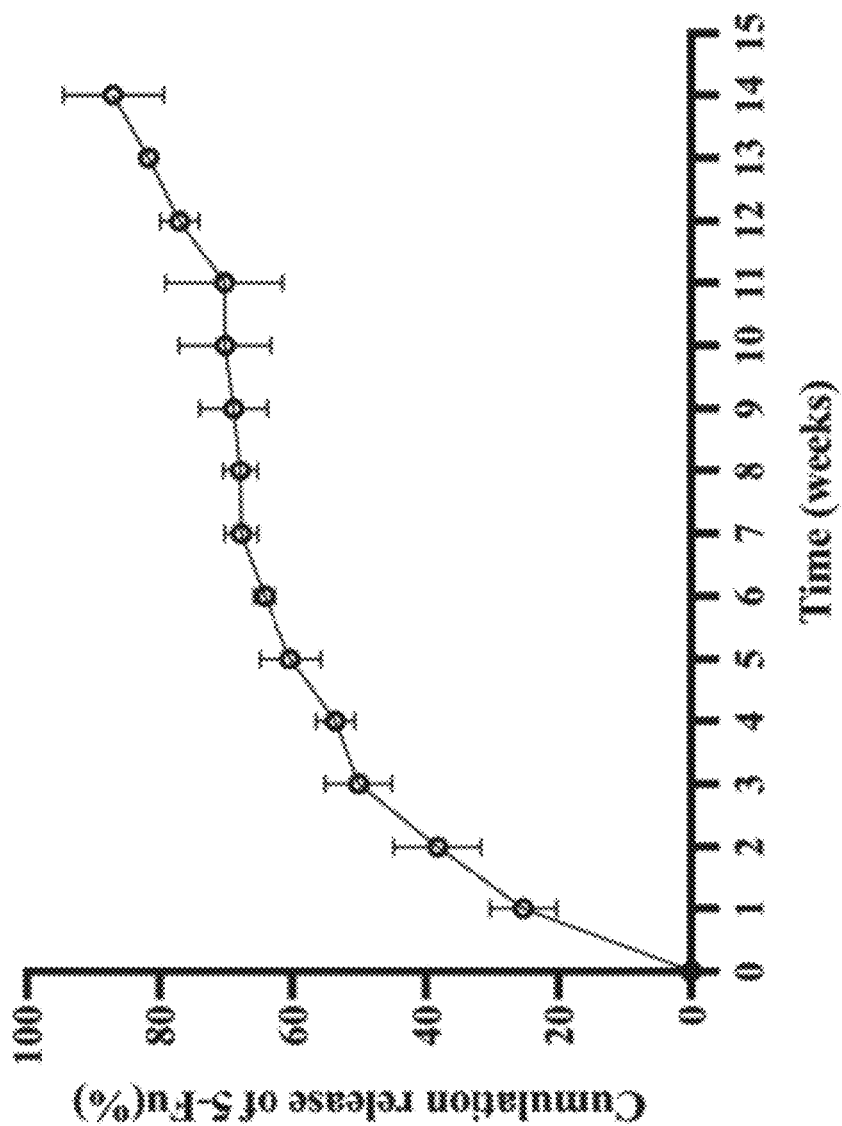
FIG. 15 is a schematic diagram illustrating a release rate of 5-fluorouracil in a drainage apparatus according to some embodiments of the present disclosure.
Figure 16:
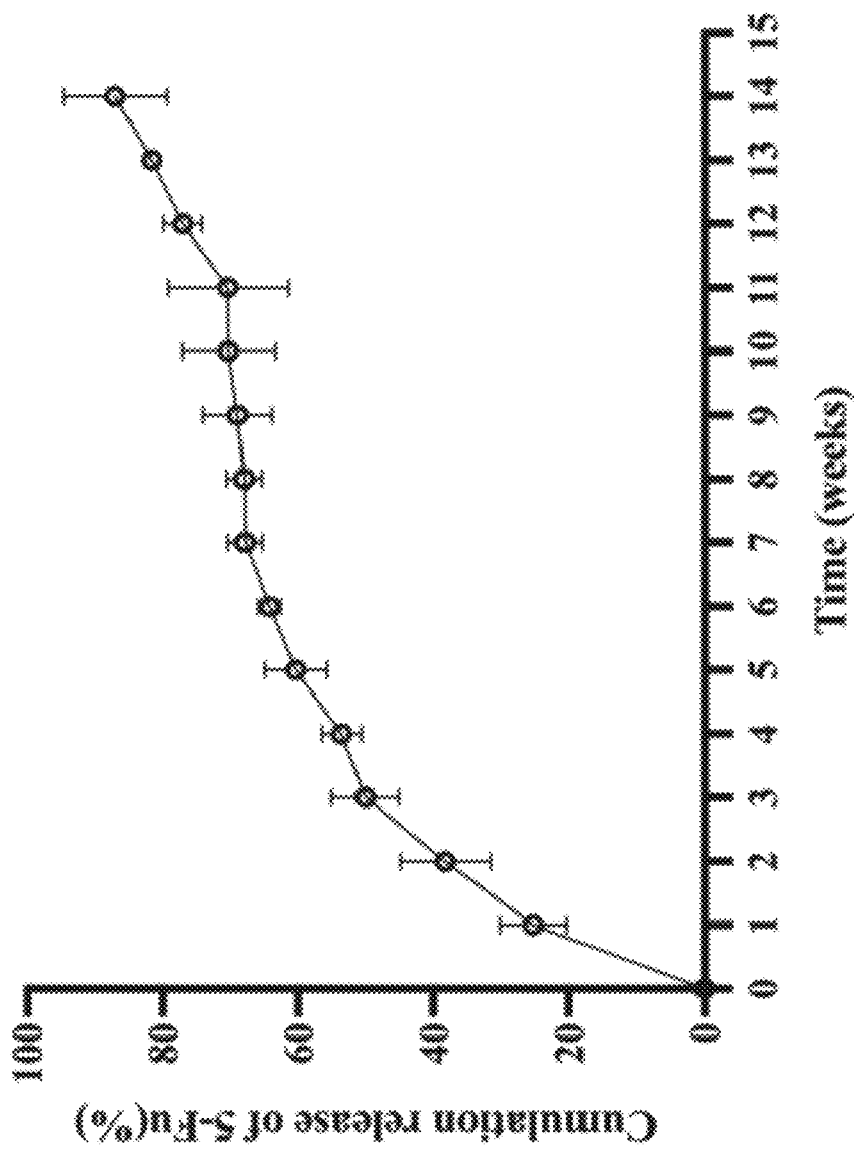
FIG. 16 is a schematic diagram of a weekly release drug concentration of 5-fluorouracil in a drainage apparatus according to some embodiments of the present disclosure.

The same manner was used to determine the cumulative release rate of 5-fluorouracil as shown in FIG. 15, and weekly release drug concentrations as shown in FIG. 16.

The basic concepts have been described above, and it is apparent to those skilled in the art that the foregoing detailed disclosure serves only as an example and does not constitute a limitation of the present disclosure. While not expressly stated herein Those types of modifications, improvements, and amendments are suggested in the present disclosure, so those types of modifications, improvements, and amendments are still within the spirit and scope of the exemplary embodiments of the present disclosure.

Also, the specification uses specific words to describe embodiments of the specification, such as "an embodiment" and/or "some embodiments" means a feature, structure, or characteristic associated with at least one embodiment of the present disclosure. Accordingly, it should be emphasized and noted that "one embodiment" or "a embodiment" referred to two or more times in different locations in the present disclosure or "one embodiment" or "some embodiments" means a feature, structure, or characteristic related to at least one embodiment of the present disclosure. "an embodiment" or "an alternative embodiment" in different places in the present disclosure do not necessarily refer to the same embodiment. In addition, certain features, structures, or characteristics of one or more embodiments of the present disclosure may be suitably combined.

Furthermore, unless expressly stated in the claims, the order of the processing elements and sequences described herein, the use of numerical letters, or the use of other names are not intended to qualify the order of the processes and methods of the present disclosure. While some embodiments of the invention that are currently considered useful are discussed in the foregoing disclosure by way of various examples, it should be appreciated that such details serve only illustrative purposes and that additional claims are not limited to the disclosed embodiments!, rather, the claims are intended to cover all amendments and equivalent combinations that are consistent with the substance and scope of the embodiments of the present disclosure.

Similarly, it should be noted that in order to simplify the presentation of the disclosure of the specification, and thereby aid in the understanding of one or more embodiments of the invention, the foregoing descriptions of embodiments of the specification sometimes combine a variety of features into a single embodiment, accompanying drawings, or descriptions thereof. description thereof. However, this method of disclosure does not imply that more features are required for the objects of the present disclosure than are mentioned in the claims. Rather, claimed subject matter may lie in less than all features of a single foregoing disclosed embodiment.

Some embodiments use numbers to describe the number of components, attributes, and it should be understood that such numbers used in the description of the embodiments are modified in some examples by the modifiers "about", "approximately", or "substantially".", "approximately", or "generally" is used in some examples. Unless otherwise noted, the terms "about," "approximate," or "approximately" indicates that a ±20% variation in the stated number is allowed. Correspondingly, in some embodiments, the numerical parameters used in the specification and claims are approximations, which can change depending on the desired characteristics of individual embodiments. In some embodiments, the numerical parameters should take into account the specified number of valid digits and employ general place-keeping. While the numerical domains and parameters used to confirm the breadth of their ranges in some embodiments of the present disclosure are approximations, in specific embodiments such values are set to be as precise as possible within a feasible range.

For each of the patents, patent applications, patent application disclosures, and other materials cited in the present disclosure, such as articles, books, specification sheets, publications, documents, etc., the entire contents of which are hereby incorporated herein by reference. Application history documents that are inconsistent with or conflict with the contents of the present disclosure are excluded, as are documents (currently or hereafter appended to the present disclosure) that limit the broadest scope of the claims of the present disclosure. It should be noted that in the event of any inconsistency or conflict between the descriptions, definitions, and/or use of terms in the materials appended to the present disclosure and those set forth herein, the descriptions, definitions and/or use of terms in the present disclosure shall control. use shall prevail.

Finally, it should be understood that the embodiments described in the present disclosure are only used to illustrate the principles of the embodiments of the present disclosure. Other deformations may also fall within the scope of the present disclosure. As such, alternative configurations of embodiments of the present disclosure may be viewed as consistent with the teachings of the present disclosure as an example, not as a limitation. Correspondingly, the embodiments of the present disclosure are not limited to the embodiments expressly presented and described herein.

What is claimed is:

1. An apparatus capable of gradient control of scars, configured for drainage of degradable glaucoma, comprising:
    a long-strip-shaped drainage sheet with a uniform overall cross-sectional size, wherein:
    the drainage sheet is made of a biodegradable material,
    an outer surface of the drainage sheet is provided with a drainage gap that penetrates through opposite sides of the drainage sheet, the outer surface of the drainage sheet is coated with a biodegradable surface coating, and
    the surface coating carries an anti-scarring drug, wherein the anti-scarring drug is configured to be gradually released as the surface coating degrades, a distribution concentration of the anti-scarring drug within the surface coating varies in a non-monotonic manner, the distribution concentration of the anti-scarring drug presents a distribution curve that, along a depth direction of the surface coating, first gradually decreases from a high point and then gradually increases, and reaches a highest point at a bottom of the surface coating.

2. The apparatus of claim 1, wherein the anti-scarring drug is composed of mitomycin-C, 5-fluorouracil, or a mixture thereof.

3. A method for preparing the apparatus capable of gradient control of scars, configured for drainage of degradable glaucoma according to claim 1, comprising:
    1) Providing the drainage sheet;
    2) preparing a surface coating solution by liquid-phase deposition;
    3) Preparing the anti-scarring drug; and
    4) placing the drainage sheet in the surface coating solution, and during the formation of the surface coating on the drainage sheet, adding the anti-scarring drug in an intermittent manner to form a surface coating with a non-monotonic change of distribution concentration on the surface of the drainage sheet,
wherein the adding the anti-scarring drug in an intermittent manner comprises:
    adding an amount of the anti-scarring drug every 10 to 30 min, wherein the amount is calculated based on a concentration in an actual solution, an initial added amount is the largest, then gradually decreasing, and when reaching one-half to two-thirds of a deposition time, gradually increasing the added amount until the deposition is complete.

* * * * *

UNITED STATES PATENT AND TRADEMARK OFFICE
CERTIFICATE OF CORRECTION

| | | |
|---|---|---|
| PATENT NO. | : 12,465,520 B2 | Page 1 of 1 |
| APPLICATION NO. | : 19/083513 | |
| DATED | : November 11, 2025 | |
| INVENTOR(S) | : Yong Wang et al. | |

It is certified that error appears in the above-identified patent and that said Letters Patent is hereby corrected as shown below:

On the Title Page

Item (73), Lines 2 to 5, "THE THIRD AFFILIATED HOSPITAL OF COMU (FANGDA HOSPITAL), Chongqing (CN)" should read --THE THIRD AFFILIATED HOSPITAL OF CQMU (FANGDA HOSPITAL), Chongqing (CN)--.

Signed and Sealed this
Sixteenth Day of December, 2025

John A. Squires
*Director of the United States Patent and Trademark Office*